United States Patent
Maehara et al.

(10) Patent No.: US 10,222,210 B2
(45) Date of Patent: Mar. 5, 2019

(54) NAVIGATION SYSTEM AND SURVEY SYSTEM

(71) Applicant: Mitsubishi Electric Corporation, Tokyo (JP)

(72) Inventors: Hideaki Maehara, Tokyo (JP); Momoyo Nagase, Tokyo (JP); Kenji Taira, Tokyo (JP); Sumio Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/561,882

(22) PCT Filed: Sep. 9, 2015

(86) PCT No.: PCT/JP2015/075598
§ 371 (c)(1),
(2) Date: Sep. 26, 2017

(87) PCT Pub. No.: WO2017/042907
PCT Pub. Date: Mar. 16, 2017

(65) Prior Publication Data
US 2018/0120107 A1 May 3, 2018

(51) Int. Cl.
*G06K 9/00* (2006.01)
*G01C 11/06* (2006.01)
*B64D 47/08* (2006.01)
(Continued)

(52) U.S. Cl.
CPC .............. *G01C 11/06* (2013.01); *B64D 47/08* (2013.01); *G01B 11/002* (2013.01); *G01C 1/04* (2013.01);
(Continued)

(58) Field of Classification Search
CPC .......... G01C 11/06; G06T 7/521; G06T 7/70; G06T 2207/10028; G06K 9/0063;
(Continued)

(56) References Cited

U.S. PATENT DOCUMENTS 4,335,520 A * 6/1982 Wilson .................... E21B 47/02
33/312
9,684,076 B1 * 6/2017 Feldkhun ................ G01S 17/89
(Continued)

FOREIGN PATENT DOCUMENTS

JP 5-118850 A 5/1993
JP 11-51611 A 2/1999
(Continued)

OTHER PUBLICATIONS

Shiozawa, et al. "The three-dimensional reconstruction from the sky using a Velodyne laser scanner", Journal of the Robotics Society of Japan, Dec. 2013, JRJS vol. 31 No. 10 pp. 992-1000.
International Search Report issued in PCT/JP2015/075598 (PCT/ISA/210), dated Dec. 8, 2015.

*Primary Examiner* — Ali Bayat
(74) *Attorney, Agent, or Firm* — Birch, Stewart, Kolasch & Birch, LLP

(57) ABSTRACT

Image matching on a pair of image data about images which are shot at different shooting positions is performed, and a point corresponding to the coordinates of a distance measurement point on the image shown by one image data of the pair is searched through the image shown by the other image data of the pair. The value of a parameter showing the attitude of an airplane (2) is corrected in such a way that the difference between the coordinates of the distance measurement point on the image shown by the other image data of the pair and the coordinates of the corresponding point which is searched for via the image matching becomes small, to estimate the attitude of the airplane (2).

6 Claims, 17 Drawing Sheets

(51) Int. Cl.
*G06T 7/70* (2017.01)
*G01B 11/00* (2006.01)
*G01S 17/89* (2006.01)
*H04N 7/18* (2006.01)
*G01C 1/04* (2006.01)
*G06T 7/593* (2017.01)
*G05D 1/08* (2006.01)

(52) U.S. Cl.
CPC .............. *G01S 17/89* (2013.01); *G06T 7/593* (2017.01); *G06T 7/70* (2017.01); *H04N 7/185* (2013.01); *G05D 1/08* (2013.01); *G06T 2207/10032* (2013.01); *G06T 2207/30244* (2013.01)

(58) Field of Classification Search
CPC ...... G06K 9/6202; B64D 47/08; G01S 17/89; H04N 7/185; G01B 11/002
See application file for complete search history.

(56) References Cited

U.S. PATENT DOCUMENTS

| | | | |
|---|---|---|---|
| 9,911,189 B1* | 3/2018 | Vawter | G06T 7/004 |
| 2009/0299635 A1* | 12/2009 | Brookes | G01S 17/89 |
| | | | 702/5 |
| 2010/0156758 A1* | 6/2010 | Anders | G01C 23/005 |
| | | | 345/8 |
| 2016/0014713 A1* | 1/2016 | Kennedy | G01S 5/0242 |
| | | | 455/456.1 |

FOREIGN PATENT DOCUMENTS

| | | |
|---|---|---|
| JP | 2001-133256 A | 5/2001 |
| JP | 2007-278844 A | 10/2007 |
| JP | 2013-187862 A | 9/2013 |
| JP | 2014-145762 A | 8/2014 |

* cited by examiner

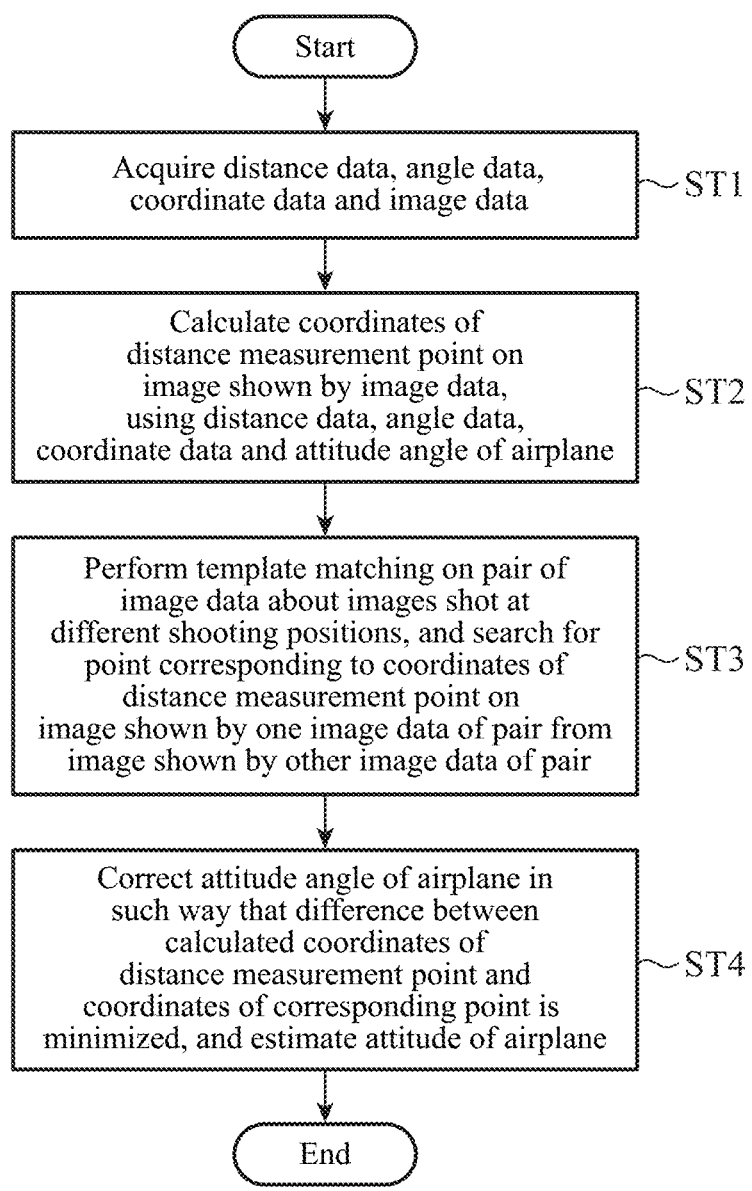

FIG.6A
| t | $X_0$ | $Y_0$ | $Z_0$ |
|---|---|---|---|
| 0 | 0 | 0 | 0 |
| 1 | 1 | 0.5 | 0 |
| 2 | 2 | 0.5 | 0.5 |
| 3 | 3 | 0 | 1 |
FIG.6B
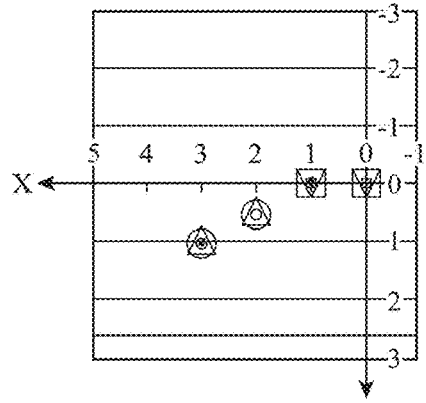
FIG.6C
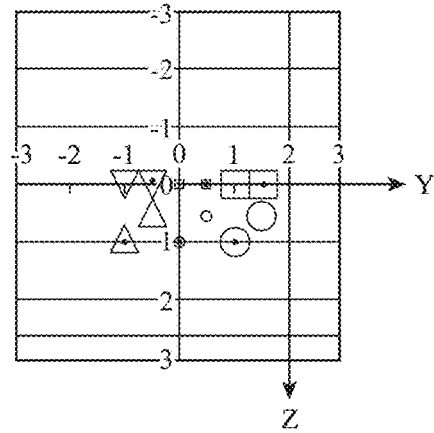
FIG.6D
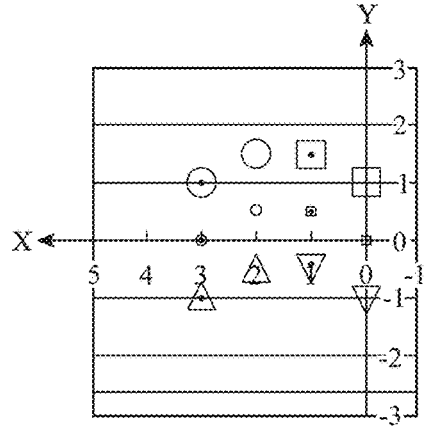

| t | θ | l |
|---|---|---|
| 0.00 | 63.0 | 9.17 |
| 0.05 | 81.0 | 9.24 |
| 0.10 | 99.0 | 10.29 |
| 0.15 | 117.0 | 11.95 |
| 1.00 | 63.0 | 10.43 |
| 1.05 | 81.0 | 9.62 |
| 1.10 | 99.0 | 10.02 |
| 1.15 | 117.0 | 10.37 |
| 2.00 | 63.0 | 8.14 |
| 2.05 | 81.0 | 7.23 |
| 2.10 | 99.0 | 8.27 |
| 2.15 | 117.0 | 11.24 |

| t | θ | L | $X_0$ | $Y_0$ | $Z_0$ | ω | φ | κ | X | Y | Z |
|---|---|---|---|---|---|---|---|---|---|---|---|
| 0.00 | 63.0 | 6.25 | 0.00 | 0.00 | 0.00 | 0.00 | 0.00 | 0.00 | 0.00 | 2.84 | 5.57 |
| 0.05 | 81.0 | 7.27 | 0.05 | 0.03 | 0.00 | 0.00 | 0.00 | 0.00 | 0.05 | 1.16 | 7.18 |
| 0.10 | 99.0 | 8.92 | 0.10 | 0.05 | 0.00 | 0.00 | 0.00 | 0.00 | 0.10 | -1.35 | 8.81 |
| 0.15 | 117.0 | 11.08 | 0.15 | 0.08 | 0.00 | 0.00 | 0.00 | 0.00 | 0.15 | -4.96 | 9.87 |
| 1.00 | 63.0 | 8.18 | 1.00 | 0.50 | 0.00 | 0.00 | 0.00 | 0.00 | 1.00 | 4.21 | 7.28 |
| 1.05 | 81.0 | 7.96 | 1.05 | 0.50 | 0.03 | 0.00 | 0.00 | 0.00 | 1.05 | 1.75 | 7.89 |
| 1.10 | 99.0 | 9.22 | 1.10 | 0.50 | 0.05 | 0.00 | 0.00 | 0.00 | 1.10 | -0.94 | 9.15 |
| 1.15 | 117.0 | 10.51 | 1.15 | 0.50 | 0.08 | 0.00 | 0.00 | 0.00 | 1.15 | -4.27 | 9.44 |
| 2.00 | 63.0 | 9.65 | 2.00 | 0.50 | 0.50 | 0.00 | 0.00 | 0.00 | 2.00 | 4.88 | 9.09 |
| 2.05 | 81.0 | 8.63 | 2.05 | 0.48 | 0.53 | 0.00 | 0.00 | 0.00 | 2.05 | 1.83 | 9.05 |
| 2.10 | 99.0 | 9.21 | 2.10 | 0.45 | 0.55 | 0.00 | 0.00 | 0.00 | 2.10 | -0.99 | 9.65 |
| 2.15 | 117.0 | 9.31 | 2.15 | 0.43 | 0.58 | 0.00 | 0.00 | 0.00 | 2.15 | -3.80 | 8.87 |

FIG. 14

| t | $X_0$ | $Y_0$ | $Z_0$ | $\omega$ | $\varphi$ | $\kappa$ | $X_L$ | $Y_L$ | $Z_L$ | $X_R$ | $Y_R$ | $Z_R$ |
|---|---|---|---|---|---|---|---|---|---|---|---|---|
| 0 | 0 | 0 | 0 | 0 | 0 | 0 | 0 | -1 | 0 | 0 | 1 | 0 |
| 1 | 1 | 0.5 | 0 | 0 | 0 | 0 | 1 | -0.5 | 0 | 1 | 1.5 | 0 |
| 2 | 2 | 0.5 | 0.5 | 0 | 0 | 0 | 2 | -0.5 | 0.5 | 2 | 1.5 | 0.5 |
| 3 | 3 | 0 | 1 | 0 | 0 | 0 | 3 | -1 | 1 | 3 | 1 | 1 |

FIG.15

| t | $X_0$ | $Y_0$ | $Z_0$ | ω | φ | κ | X | Y | Z | $x_L$ | $y_L$ | $x_R$ | $y_R$ |
|---|---|---|---|---|---|---|---|---|---|---|---|---|---|
| 0.00 | 0.00 | 0.00 | 0.00 | 0.00 | 0.00 | 0.00 | 0.00 | 2.84 | 5.57 | 0.0 | -689.1 | 179.6 | -240.1 |
| 0.05 | 0.05 | 0.03 | 0.00 | 0.00 | 0.00 | 0.00 | 0.05 | 1.16 | 7.18 | -7.0 | -301.2 | 132.4 | 47.2 |
| 0.10 | 0.10 | 0.05 | 0.00 | 0.00 | 0.00 | 0.00 | 0.10 | -1.35 | 8.81 | -11.4 | 39.2 | 102.2 | 323.0 |
| 0.15 | 0.15 | 0.08 | 0.00 | 0.00 | 0.00 | 0.00 | 0.15 | -4.96 | 9.87 | -15.2 | 400.7 | 86.1 | 653.8 |
| 1.00 | 1.00 | 0.50 | 0.00 | 0.00 | 0.00 | 0.00 | 1.00 | 4.21 | 7.28 | 0.0 | -646.8 | 147.4 | -399.7 |
| 1.05 | 1.05 | 0.50 | 0.03 | 0.00 | 0.00 | 0.00 | 1.05 | 1.75 | 7.89 | -6.3 | -284.7 | 128.6 | -33.2 |
| 1.10 | 1.10 | 0.50 | 0.05 | 0.00 | 0.00 | 0.00 | 1.10 | -0.94 | 9.15 | -10.9 | 48.3 | 104.0 | 282.2 |
| 1.15 | 1.15 | 0.50 | 0.08 | 0.00 | 0.00 | 0.00 | 1.15 | -4.27 | 9.44 | -15.9 | 399.5 | 95.1 | 645.6 |
| 2.00 | 2.00 | 0.50 | 0.50 | 0.00 | 0.00 | 0.00 | 2.00 | 4.88 | 9.09 | 0.0 | -625.9 | 123.5 | -479.2 |
| 2.05 | 2.05 | 0.48 | 0.53 | 0.00 | 0.00 | 0.00 | 2.05 | 1.83 | 9.05 | -5.8 | -272.0 | 118.0 | -102.5 |
| 2.10 | 2.10 | 0.45 | 0.55 | 0.00 | 0.00 | 0.00 | 2.10 | -0.99 | 9.65 | -10.9 | 53.7 | 104.1 | 230.2 |
| 2.15 | 2.15 | 0.43 | 0.58 | 0.00 | 0.00 | 0.00 | 2.15 | -3.80 | 8.87 | -17.9 | 394.4 | 108.0 | 610.1 |

FIG.16

| t | i | j | $x_{Li}$ | $y_{Li}$ | $x_{Rj}$ | $y_{Rj}$ | $SCAN_x(x_{Li},y_{Li})$ | $SCAN_y(x_{Li},y_{Li})$ |
|---|---|---|---|---|---|---|---|---|
| 0.00 | 0 | 1 | 0.0 | -689.1 | 179.6 | -240.1 | 181 | -234 |
| 0.05 | 0 | 1 | -7.0 | -301.2 | 132.4 | 47.2 | 140 | 54 |
| 0.10 | 0 | 1 | -11.4 | 39.2 | 102.2 | 323.0 | 115 | 331 |
| 0.15 | 0 | 1 | -15.2 | 400.7 | 86.1 | 653.8 | 105 | 664 |
| 1.00 | 1 | 2 | 0.0 | -646.8 | 147.4 | -399.7 | 181 | -422 |
| 1.05 | 1 | 2 | -6.3 | -284.7 | 128.6 | -33.2 | 151 | -50 |
| 1.10 | 1 | 2 | -10.9 | 48.3 | 104.0 | 282.2 | 117 | 265 |
| 1.15 | 1 | 2 | -15.9 | 399.5 | 95.1 | 645.6 | 98 | 623 |
| 2.00 | 2 | 3 | 0.0 | -625.9 | 123.5 | -479.2 | 91 | -468 |
| 2.05 | 2 | 3 | -5.8 | -272.0 | 118.0 | -102.5 | 89 | -93 |
| 2.10 | 2 | 3 | -10.9 | 53.7 | 104.1 | 230.2 | 78 | 240 |
| 2.15 | 2 | 3 | -17.9 | 394.4 | 108.0 | 610.1 | 86 | 624 |

FIG.17

$$\begin{bmatrix} 0.566 \\ 7.875 \\ 6.856 \\ 7.687 \\ 12.471 \\ 8.986 \\ 19.176 \\ 10.652 \\ 33.230 \\ -22.260 \\ 21.755 \\ -18.065 \\ 12.723 \\ -17.793 \\ 2.605 \\ -22.489 \\ -33.015 \\ 11.227 \\ -29.549 \\ 9.896 \\ -27.653 \\ 8.090 \\ -23.613 \\ 10.955 \end{bmatrix}$$

FIG.18

$$\begin{bmatrix}
0.958 & 17.715 & -7.824 & 0.000 & 0.000 & 0.000 \\
-20.003 & -0.696 & -2.137 & 0.000 & 0.000 & 0.000 \\
0.179 & 16.770 & -1.717 & 0.000 & 0.000 & 0.000 \\
-16.575 & 0.006 & -1.818 & 0.000 & 0.000 & 0.000 \\
-0.289 & 15.845 & 3.260 & 0.000 & 0.000 & 0.000 \\
-16.689 & 0.465 & -1.545 & 0.000 & 0.000 & 0.000 \\
-0.659 & 14.947 & 8.256 & 0.000 & 0.000 & 0.000 \\
-20.146 & 0.896 & -1.393 & 0.000 & 0.000 & 0.000 \\
-1.069 & -18.446 & 9.399 & 1.069 & 17.679 & -9.399 \\
22.438 & 0.000 & 0.000 & -21.445 & -0.843 & -1.986 \\
-0.291 & -17.453 & 2.764 & 0.291 & 16.728 & -2.764 \\
17.608 & 0.000 & 0.000 & -16.689 & -0.103 & -1.837 \\
0.248 & -16.456 & -2.606 & -0.248 & 15.783 & 2.606 \\
17.165 & 0.000 & 0.000 & -16.333 & 0.452 & -1.663 \\
0.764 & -15.550 & -7.923 & -0.764 & 14.871 & 7.923 \\
20.681 & 0.000 & 0.000 & -19.839 & 1.089 & -1.682 \\
0.000 & 0.000 & 0.000 & -1.414 & -18.745 & 9.551 \\
0.000 & 0.000 & 0.000 & 23.265 & 0.000 & 0.000 \\
0.000 & 0.000 & 0.000 & -0.401 & -17.762 & 2.813 \\
0.000 & 0.000 & 0.000 & 18.018 & 0.000 & 0.000 \\
0.000 & 0.000 & 0.000 & 0.307 & -16.624 & -2.633 \\
0.000 & 0.000 & 0.000 & 17.253 & 0.000 & 0.000 \\
0.000 & 0.000 & 0.000 & 0.700 & -15.493 & -7.894 \\
0.000 & 0.000 & 0.000 & 20.166 & 0.000 & 0.000
\end{bmatrix}$$

FIG.19

$$\begin{bmatrix}
2898.426 & 2.395 & 94.989 & -1467.572 & 1.059 & -122.681 \\
2.395 & 2228.500 & -48.361 & -8.839 & -1109.056 & 55.515 \\
94.989 & -48.361 & 320.705 & 17.553 & 53.437 & -165.550 \\
-1467.572 & -8.839 & 17.553 & 2973.674 & 16.981 & 95.263 \\
1.059 & -1109.056 & 53.437 & 16.981 & 2248.020 & -117.094 \\
-122.681 & 55.515 & -165.550 & 95.263 & -117.094 & 346.846
\end{bmatrix}$$

FIG.20

$$\begin{bmatrix}
-2288.739 \\
-625.035 \\
441.901 \\
2385.871 \\
3148.297 \\
-313.098
\end{bmatrix}$$

$$\begin{bmatrix} -0.583 \\ 0.569 \\ 1.234 \\ 0.506 \\ 1.638 \\ -0.197 \end{bmatrix}$$

| t | ω | φ | κ |
|---|---|---|---|
| 0.00 | 0.000 | 0.000 | 0.000 |
| 1.00 | -0.502 | 0.507 | 1.013 |
| 2.00 | 0.501 | 1.501 | -0.497 |
| 3.00 | 0.000 | 0.000 | 0.000 |

NAVIGATION SYSTEM AND SURVEY SYSTEM

TECHNICAL FIELD

The present invention relates to a navigation system that estimates the attitude of a moving body in which a camera for surveys and a laser distance measuring device are mounted, and a survey system provided with this navigation system.

BACKGROUND ART

Patent Literature 1, for example, discloses a survey system that performs photographic surveying and airborne laser scanning by using a camera and a laser emitting and receiving device which are mounted in a flying body.

In this survey system, the camera that shoots a survey target from the flying body is supported by an attitude stabilizing device called a stabilizer, and the shooting direction can be kept aligned with a vertically downward direction regardless of the attitude of the flying body in flight.

Further, the laser emitting and receiving device projects laser light to a survey target from the flying body at a predetermined period, and receives light reflected from this survey target. A control device in this survey system performs the airborne laser scanning by using information about the reflected light from the survey target which is received by the laser emitting and receiving device. The laser emitting and receiving device corresponds to a laser distance measuring device according to the present invention.

In the airborne laser scanning, both three-dimensional coordinate data about the flying body (the horizontal position and the altitude of the flying body) and information showing the attitude of the flying body in flight are needed in addition to the above-mentioned information. The three-dimensional coordinate data about the flying body, among these pieces of information, is detected by a GNSS (Global Navigation Satellite System) device mounted in the flying body. More specifically, the GNSS device receives GNSS information from a GNSS satellite at a predetermined period, and analyzes this GNSS information to acquire the three-dimensional coordinate data about the flying body.

On the other hand, the length of the period at which the laser light is projected to a survey target by the laser emitting and receiving device is shorter than the length of the period at which GNSS information is received by the GNSS device. Therefore, even if reflected light from a survey target is received by the laser emitting and receiving device, the control device cannot acquire the three-dimensional coordinate data about the flying body at a certain period not matching the period at which GNSS information is received.

In contrast with this, in conventional typical airborne laser scanning, three-dimensional coordinate data about a flying body are acquired at a certain period other than the period at which GNSS information is received, by using information about acceleration along three axes and angular acceleration along three axes which are measured by an IMU (Inertial Measurement Unit) mounted in the flying body.

However, because the IMU is very expensive and is relatively heavy, a limitation is imposed on the types of flying bodies into which this IMU can be incorporated.

Accordingly, in the survey system described in Patent Literature 1, instead of the IMU, an accelerometer and an angular accelerometer which are less expensive and smaller than the IMU are disposed.

More specifically, this survey system acquires three-dimensional coordinate data about a flying body at a certain period not matching the period at which GNSS information is received, by using both information about acceleration along three axes from the accelerometer and information about angular acceleration along three axes from the angular accelerometer.

Further, information showing the attitude of the flying body is angles in a rolling direction, a pitching direction and a yawing direction of the flying body (referred to as a roll angle, a pitch angle and a yaw angle from here on), and values acquired by bundle calculation for corresponding points of images which are shot from two or more different positions by a camera are used. The control device calculates an attitude of the flying body at each scan period of laser light (this period does not match the period at which the GNSS information is received) in accordance with the attitude of the flying body acquired by the bundle calculation and by using both the acceleration from the accelerometer and the angular acceleration from the angular accelerometer.

CITATION LIST

Patent Literature

Patent Literature 1: Japanese Unexamined Patent Application Publication No. 2014-145762

SUMMARY OF INVENTION

Technical Problem

The survey system described in Patent Literature 1 estimates the attitude of the flying body by the bundle calculation using the image data about images captured from different positions by a camera, and uses only the image data for the estimation of the attitude. Therefore, the estimation accuracy of the attitude has a limit.

Further, the above-mentioned survey system is based on the premise that information of images to be used for the estimation of the attitude of the flying body is taken with the camera pointing vertically downward with respect to the flying body, regardless of the attitude of the flying body.

Thus, a stabilizer for keeping the imaging direction of the camera vertically downward at all times needs to be provided, and therefore the system configuration becomes complicated.

The present invention is made in order to solve the above-mentioned problems, and it is therefore an object of the present invention to provide a navigation system and a survey system capable of estimating the attitude of a moving body with a high degree of accuracy by using a configuration not having any IMU and any stabilizer.

Solution to Problem

According to the present invention, there is provided a navigation system including: a data acquiring unit for acquiring distance data showing a distance from a projection reference point of laser light to a distance measurement point, the distance being measured by a laser distance measuring device mounted in a moving body, angle data showing a projection angle of the laser light, coordinate data showing three-dimensional coordinates of the projection reference point of the laser light, the three-dimensional coordinates being measured by a coordinate measuring device mounted in the moving body, and image data containing a distance measurement point on an object taken by an image shooting device mounted in the moving body; a coordinate calculating unit for calculating coordinates of the distance measurement point on an image shown by the image data on a basis of the distance data, the angle data and the coordinate data that are acquired by the data acquiring unit, and a parameter showing an attitude of the moving body; an image matching unit for performing image matching on a pair of pieces of image data taken by the image shooting device at different shooting positions, and searching an image shown by one image data of the pair for a point corresponding to coordinates of a distance measurement point on an image shown by the other image data of the pair, the coordinates being calculated by the coordinate calculating unit; and an attitude estimating unit for correcting a value of the parameter showing the attitude of the moving body in such a way that a difference between coordinates of the distance measurement point on the image shown by the other image data of the pair, the coordinates being calculated by the coordinate calculating unit, and coordinates of the corresponding point searched for by the image matching unit becomes small, and estimating the attitude of the moving body.

Advantageous Effects of Invention

Because the navigation system according to the present invention pays attention to the fact that the coordinates of corresponding points between images shot at different shooting positions deviate from each other dependently on the attitude of the moving body, and corrects the value of the parameter showing the attitude of the moving body in such a way that the difference between these coordinates becomes small, to estimate the attitude of the moving body, the navigation system can estimate the attitude of the moving body even if the navigation system does not use an IMU and a stabilizer.

Further, because the navigation system estimates the attitude of the moving body by using, in addition to image data about an image containing a shot distance measurement point, the distance from the projection reference point of laser light to the distance measurement point, the projection angle of the laser light and the three-dimensional coordinates of the projection reference point of the laser light, the navigation system can estimate the attitude of the moving body with a high degree of accuracy.

BRIEF DESCRIPTION OF DRAWINGS

FIG. 3 illustrates block diagrams showing the hardware configuration of the navigation system according to Embodiment 1, wherein

FIG. 4 is a flowchart showing an overview of the operation of the navigation system according to Embodiment 1;

FIG. 5 illustrates diagrams schematically showing a positional relationship among a left camera, a right camera and a laser distance measuring device, wherein

FIG. 6 illustrates diagrams showing changes in the positions of the left camera, the right camera and the laser distance measuring device, the changes being caused by a flight of an airplane, wherein FIG. 6A shows data about the position coordinates of the laser distance measuring device, FIG. 6B is a graph in which the position coordinates of the left camera, the right camera and the laser distance measuring device are plotted on an XZ plane, FIG. 6C is a graph in which these position coordinates are plotted on a YZ plane, and FIG. 6D is a graph in which these position coordinates are plotted on an XY plane;

FIG. 7 illustrates diagrams showing changes in results of measurements performed by the laser distance measuring device, the changes being caused by a flight of the airplane, wherein

FIG. 13 is a diagram showing results of the calculation of the three-dimensional coordinates of a distance measurement point;

FIG. 14 is a diagram showing the coordinates of the projection centers of the left camera and the right camera;

FIG. 15 is a diagram showing the coordinates of distance measurement points on images shot by the left and right cameras;

FIG. 16 is a diagram showing the coordinates of a distance measurement point on a left camera image at each time i, and the coordinates of a point corresponding to the above-mentioned coordinates and existing on a right camera image at a time j, the point being searched for through image matching;

FIG. 17 is a diagram showing a constant vector of an observation equation;

FIG. 18 is a diagram showing a design matrix;

FIG. 19 is a diagram showing the product of the transpose of the design matrix shown in FIG. 18, and the design matrix;

FIG. 20 is a diagram showing the product of a matrix acquired from the product of the transpose of the design matrix shown in FIG. 18 and the constant vector shown in FIG. 17, and the inverse of the matrix of FIG. 19;

DESCRIPTION OF EMBODIMENTS

Hereafter, in order to explain this invention in greater detail, embodiments of the present invention will be described with reference to the accompanying drawings.

Embodiment 1.

Figure 1:
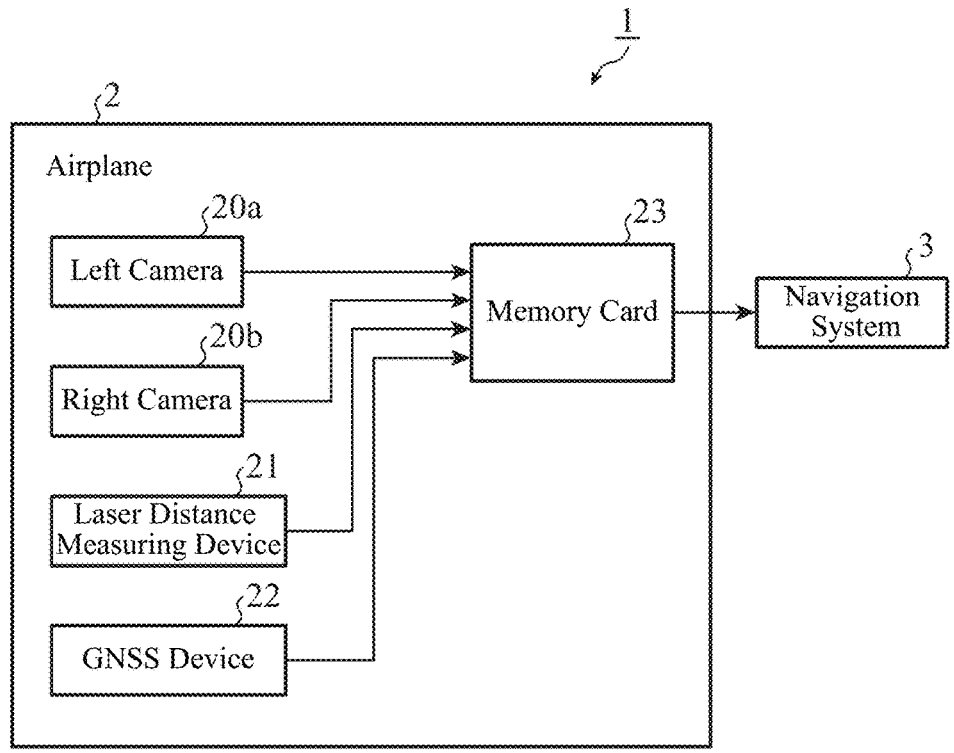
FIG. 1 is a block diagram showing the configuration of a survey system according to Embodiment 1 of the present invention.

FIG. 1 is a block diagram showing the configuration of a survey system 1 according to Embodiment 1 of the present invention. The survey system 1 surveys geographical features from an airplane 2, and includes a left camera 20a, a right camera 20b, a laser distance measuring device 21, a GNSS device 22 and a memory card 23 which are mounted in the airplane 2, and a navigation system 3. The navigation system 3 estimates the attitude of the airplane 2 in flight, and, as shown in FIG. 1, is disposed separately from the airplane 2. Alternatively, the navigation system 3 may be mounted in the airplane 2. Further, the attitude of the airplane 2 is specified by the following three parameters: a roll angle ω, a pitch angle φ and a yaw angle κ which are attitude angles in a rolling direction, in a pitching direction and in a yawing direction of the airplane 2.

The airplane 2 is an embodiment of a moving body described in the present invention, and can fly with the left camera 20a, the right camera 20b, the laser distance measuring device 21, the GNSS device 22 and the memory card 23 mounted therein. For example, an airplane which a pilot on board operates may be used, or a UAV (Unmanned Aerial Vehicle) may be used.

The left camera 20a and the right camera 20b are components which are embodiments of a first shooting unit and a second shooting unit according to the present invention, and each of the cameras shoots a ground surface including a distance measurement point of the laser distance measuring device 21. In this case, a device including the left camera 20a, the right camera 20b and a control device for controlling shooting processes performed by these cameras corresponds to an image shooting device according to the present invention. For example, the control device instructs the left camera 20a and the right camera 20b to shoot a ground surface at a predetermined period, and stores image data in which an image acquired via shooting and a shooting date are brought into correspondence with each other in the memory card 23. As the predetermined period, it is conceivable to perform shooting every second.

The laser distance measuring device 21 measures a distance l from a projection reference point of laser light to a distance measurement point by projecting the laser light to a ground surface which is a survey target while changing a projection angle θ of the laser light.

Further, every time the laser distance measuring device 21 measures the distance l, the laser distance measuring device 21 stores distance data showing this distance l and angle data showing the projection angle θ of the laser light at which this distance l is acquired in the memory card 23.

The GNSS device 22 is a component which is a concrete example of a coordinate measuring device according to the present invention, and measures the three-dimensional coordinates of the projection reference point of the laser light in the laser distance measuring device 21.

The GNSS device 22 also stores coordinate data showing the three-dimensional coordinates of the projection reference point in the memory card 23 at a predetermined period. For example, the GNSS device measures the coordinates every second in synchronization with the shooting performed by the left camera 20a and the right camera 20b.

The difference between the position of the GNSS device 22 and the position of the projection reference point falls within an allowable range, with respect to the accuracy of measurement of the GNSS device 22. More specifically, it is assumed that the GNSS device 22 is located at the same position as the projection reference point, and the position of the projection reference point has the same meaning as the position of the airplane 2.

The memory card 23 is a component which is a concrete example of a storage device according to the present invention, and stores distance data, angle data, image data and coordinate data which are acquired during a flight of the airplane 2.

As the memory card 23, for example, an SD (Secure Digital) memory card can be used.

Figure 2:
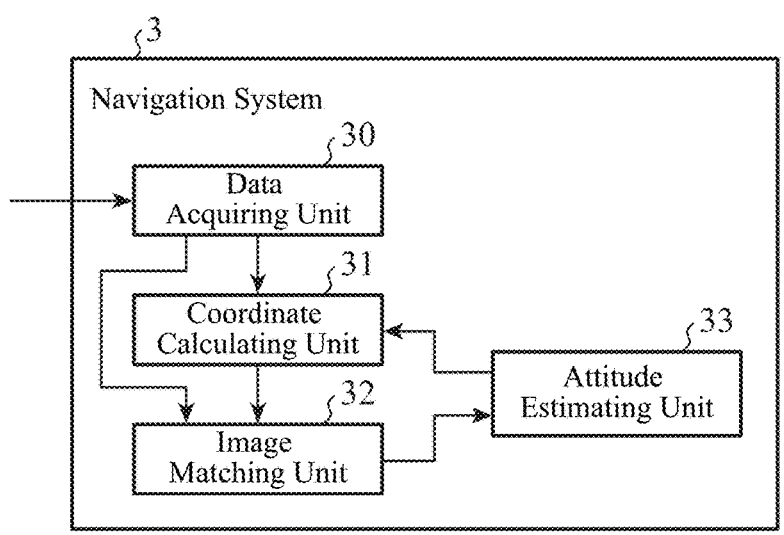
FIG. 2 is a block diagram showing the function configuration of a navigation system according to Embodiment 1.

FIG. 2 is a block diagram showing the function configuration of the navigation system 3. The navigation system 3 includes a data acquiring unit 30, a coordinate calculating unit 31, an image matching unit 32 and an attitude estimating unit 33, as shown in FIG. 2. The data acquiring unit 30 is a component that acquires distance data, angle data, coordinate data and image data which are stored in the memory card 23 of the airplane 2.

For example, the data acquiring unit 30 connects to the card drive of the memory card 23 via a cable or radio, and reads and acquires the above-mentioned data.

The coordinate calculating unit 31 calculates the coordinates of a distance measurement point on the image shown by image data by using the distance data, the angle data and the coordinate data, which are acquired by the data acquiring unit 30, and the attitude angles of the airplane 2 (the roll angle ω, the pitch angle φ and the yaw angle κ). For example, the coordinate calculating unit calculates the three-dimensional coordinates of a distance measurement point by using the distance l from the projection reference point of the laser light to the distance measurement point, the projection angle θ of the laser light, the three-dimensional coordinates of the projection reference point of the laser light, and the roll angle ω, the pitch angle φ and the yaw angle κ of the airplane 2. The coordinate calculating unit then calculates the coordinates of the distance measurement point on the image shown by each of image data generated by the left camera 20a and the right camera 20b by using the three-dimensional coordinates of the distance measurement point, the coordinates of the projection center of the left camera 20a and the coordinates of the projection center of the right camera 20b.

Because the roll angle ω, the pitch angle φ and the yaw angle κ of the airplane 2 are unknown, and correction amounts for the attitude angles are not calculated first, the coordinate calculating unit calculates the coordinates by using the roll angle ω=0, the pitch angle φ=0 and the yaw angle κ=0 as their initial values. The details of this coordinate calculation will be described below.

The image matching unit 32 performs image matching on a pair of image data about an image shot at a shooting position by at least one of the left camera 20a and the right camera 20b, and image data about an image shot at a different shooting position by at least one of the left camera 20a and the right camera 20b, and searches for a point corresponding to the coordinates of a distance measurement point on the image shown by one (referred to as first image data from here on as needed) of the pair of image data, through the image shown by the other image data (referred to as second image data from here on as needed) of the pair.

As an image matching method, a well-known template matching method of examining the degree of similarity between two images, or the like can be used. For example, both the two image data are compared with each other with the first image data being set as template image data and the second image data being set as image data to be compared, and a point corresponding to the coordinates of a distance measurement point on the template image is searched for through the image shown by the image data to be compared.

Further, because what is necessary is just to use a pair of image data about images shot at different shooting positions as the pair of image data, image data about an image shot at a time i during a flight of the airplane 2 and image data about an image shot at a time j later than this time i during the flight can be alternatively used.

As an alternative, as the pair of image data, a pair of image data about respective images shot at a time i by the left camera 20a and the right camera 20b can be used.

As an alternative, as the pair of image data, a pair of image data about an image shot at a time i by at least one of the left camera 20a and the right camera 20b and image data about an image shot at a time j later than the time i by at least one of the cameras can be used.

By using such a pair of image data as above, a change in an object to be shot on images, the change being dependent on the attitude of the airplane 2, can be used for the estimation of the attitude of the airplane 2.

In other words, because the survey system according to the present invention uses a change in an object to be shot on images, the change being dependent on the attitude of the airplane 2, for the estimation of the attitude of the airplane 2, no stabilizers are needed for the left camera 20a and the right camera 20b.

The attitude estimating unit 33 corrects the values of the attitude angles of the airplane 2 in such a way that the difference between the coordinates of the distance measurement point on the image shown by the other image data (second image data) of the pair, the coordinates being calculated by the coordinate calculating unit 31, and the coordinates of the corresponding point which is searched for by the image matching unit 32 becomes small, to estimate the attitude of the airplane 2. As mentioned above, the coordinate calculating unit 31 calculates the coordinates of the distance measurement point on the image by using the attitude angles $(\omega, \phi, \kappa)=(0, 0, 0)$ as their initial values. Therefore, when the airplane 2 flies while rotating, the coordinates of the above-mentioned distance measurement point, which are calculated by the coordinate calculating unit 31, do not match the coordinates of the above-mentioned corresponding point which is searched for by the image matching unit 32.

To solve this problem, the attitude estimating unit 33 calculates correction amounts for the values of the attitude angles of the airplane 2 in such a way that the difference between the coordinates of these two points becomes small, and estimates the attitude angles which minimize the difference between the coordinates of the two points as final attitude angles of the airplane 2. As a result, the attitude estimating unit can estimate the attitude angles of the airplane 2 with a high degree of accuracy by using the distance data, the angle data, the coordinate data and the image data.

Figure 3A:
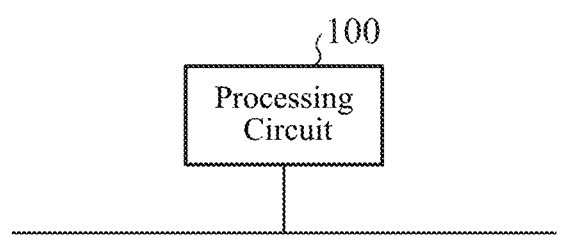
FIG. 3A shows a processing circuit which is hardware for implementing the functions of the navigation system and FIG. 3B shows a hardware configuration which executes software for implementing the functions of the navigation system.
Figure 3B:
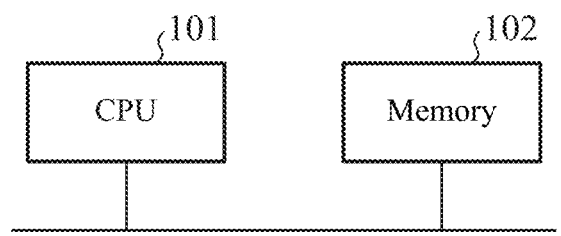

FIG. 3 illustrates block diagrams showing the hardware configuration of the navigation system 3. FIG. 3A shows a processing circuit 100 which is hardware for implementing the functions of the navigation system 3, and FIG. 3B shows a hardware configuration which executes software for implementing the functions of the navigation system 3. FIG. 4 is a flow chart showing an overview of the operation of the navigation system 3.

The functions of the data acquiring unit 30, the coordinate calculating unit 31, the image matching unit 32 and the attitude estimating unit 33 of the navigation system 3 are implemented by a processing circuit.

More specifically, the navigation system 3 includes a processing circuit for performing a step ST1 of acquiring distance data, angle data, coordinate data and image data, a step ST2 of calculating the coordinates of a distance measurement point on an image shown by image data by using the distance data, the angle data, the coordinate data and the attitude angles of the airplane 2, a step ST3 of performing image matching on a pair of image data about images shot at different shooting positions, to search for a point corresponding to the coordinates of a distance measurement point on the image shown by one image data of the pair, through the image shown by the other image data of the pair, and a step ST4 of correcting the values of the attitude angles of the airplane 2 in such a way that the difference between the coordinates of the distance measurement point on the image shown by the other image data of the pair and the coordinates of the corresponding point which is searched for by the image matching unit 32 becomes small, to estimate the attitude of the airplane 2, the steps being shown in FIG. 4.

The processing circuit can be hardware for exclusive use, or a CPU (Central Processing Unit) that executes a program stored in a memory.

As shown in FIG. 3A, in the case in which the above-mentioned processing circuit is the processing circuit 100 which is hardware for exclusive use, the processing circuit 100 is, for example, a single circuit, a composite circuit, a programmed processor, a parallel programmed processor, an ASIC (Application Specific Integrated Circuit), an FPGA (Field-Programmable Gate Array), or a circuit which is a combination of some of these circuits.

In addition, the functions of each of the following units: the data acquiring unit 30, the coordinate calculating unit 31, the image matching unit 32 and the attitude estimating unit 33 can be implemented by respective processing circuits, or can be implemented collectively by a single processing circuit.

In the case in which the above-mentioned processing circuit is a CPU 101, as shown in FIG. 3B, the functions of the data acquiring unit 30, the coordinate calculating unit 31, the image matching unit 32 and the attitude estimating unit 33 are implemented by software, firmware or a combination of software and firmware.

Software and firmware are described as programs and stored in the memory 102. The CPU 101 implements the functions of each of the units by reading and executing programs stored in the memory 102.

More specifically, in the case in which the navigation system 3 is implemented by the CPU 101, the memory 102 is disposed to store the programs which the CPU executes so as to perform, as a result, the processes of steps ST1 to ST4 shown in FIG. 4. These programs are provided to cause a computer to execute procedures or methods which are carried out by the data acquiring unit 30, the coordinate calculating unit 31, the image matching unit 32 and the attitude estimating unit 33.

Here, the memory is, for example, a nonvolatile or volatile semiconductor memory, such as a RAM (Random Access Memory), a ROM, a flash memory, an EPROM (Erasable Programmable ROM) or an EEPROM (Electrically EPROM), a magnetic disk, a flexible disk, an optical disk, a compact disk, a mini disk, or a DVD (Digital Versatile Disk).

A part of the functions of the data acquiring unit 30, the coordinate calculating unit 31, the image matching unit 32 and the attitude estimating unit 33 can be implemented by hardware for exclusive use and another part of the functions can be implemented by software or firmware.

For example, the processing circuit 100 which is hardware for exclusive use implements the functions of the data acquiring unit 30, and the CPU 101 implements the functions of the coordinate calculating unit 31, the image matching unit 32 and the attitude estimating unit 33 by executing programs stored in the memory 102.

In the way mentioned above, the above-mentioned processing circuit can implement the above-mentioned functions by using hardware, software, firmware or a combination of some of these elements.

FIG. 5 illustrates diagrams schematically showing a positional relationship among the left camera 20a, the right camera 20b and the laser distance measuring device 21. FIG. 5A is a perspective view of a unit provided with the left camera 20a, the right camera 20b and the laser distance measuring device 21, FIG. 5B is a diagram showing the unit when viewed from a direction of an X axis, FIG. 5C is a diagram showing the unit when viewed from a direction of a Z axis, and FIG. 5D is a diagram showing the unit when viewed from a direction of a Y axis. As shown in FIG. 5A, the left camera 20a is attached to an end of an arm 20c extending leftward from the laser distance measuring device 21, and the right camera 20b is attached to an end of an arm 20d extending rightward from the laser distance measuring device 21. The length of each of both the arms 20c and 20d is, for example, 1 m. Further, the shooting directions of the left camera 20a and the right camera 20b are oriented toward a vertically downward direction with respect to the airplane 2 (a direction of the Z axis).

Figure 5C:
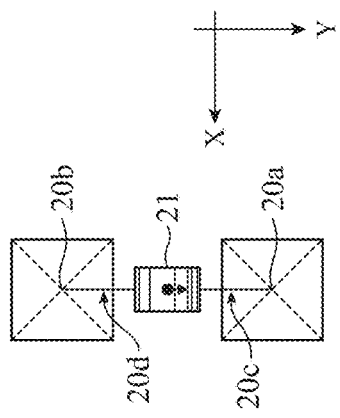
FIG. 5C is a diagram showing the unit when viewed from a direction of a Z axis.
Figure 5D:
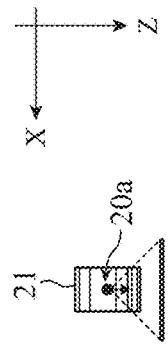
FIG. 5D is a diagram showing the unit when viewed from a direction of a Y axis.
Figure 5A:
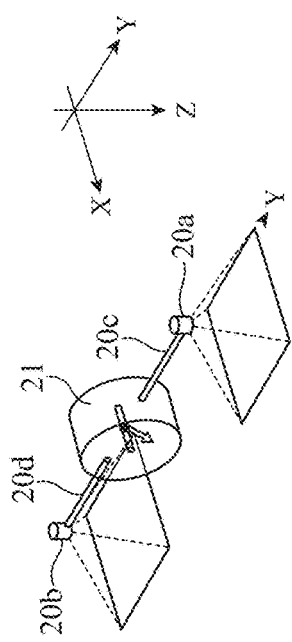
FIG. 5A is a perspective view of a unit provided with the left camera, the right camera and the laser distance measuring device.
Figure 5B:
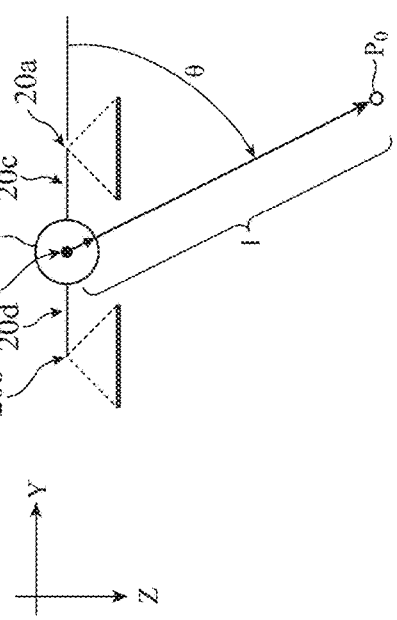
FIG. 5B is a diagram showing the unit when viewed from a direction of an X axis.

The laser distance measuring device 21 projects laser light from the projection reference point 21a to a distance measurement point $P_0$ on a ground surface and receives reflected light from the distance measurement point $P_0$ while changing the projection angle θ of the laser light, to measure the distance l from the projection reference point 21a to the distance measurement point $P_0$, as shown in FIG. 5B. It is assumed that the projection angle θ at which laser light is projected from the projection reference point 21a toward the vertically downward direction is 90 degrees.

The left camera 20a and the right camera 20b acquire image data, as will be mentioned below using FIG. 8, by shooting images of rectangular image shooting areas, as shown in FIG. 5C.

Here, it is assumed that the position of the projection reference point 21a is the same as that of the airplane 2. Therefore, when the airplane 2 makes a level flight in a direction of the X axis, the unit which configured by the left camera 20a, the right camera 20b and the laser distance measuring device 21 also moves in the direction of the X axis, as shown in FIG. 5D.

However, in an actual flight environment, even if the airplane 2 intends to make a level flight, the airplane cannot have a linear flight path under the influence of winds and so on. More specifically, the airplane 2 flies in a state in which the airplane rotates in a rolling direction, in a pitching direction and in a yawing direction.

FIG. 6 illustrates diagrams showing changes in the positions of the left camera 20a, the right camera 20b and the laser distance measuring device 21, the changes being caused by a flight of the airplane. FIG. 6A shows data about the coordinates of the position of the laser distance measuring device 21. FIG. 6B is a graph in which the coordinates of the positions of the left camera 20a, the right camera 20b and the laser distance measuring device 21 are plotted on the XZ plane. FIG. 6C is a graph in which these position coordinates are plotted on the YZ plane, and FIG. 6D is a graph in which these position coordinates are plotted on the XY plane. As shown in FIG. 6A, the airplane 2 was located at the point of origin (0, 0, 0) of the XYZ coordinate system at a time t=0, and had made a level flight for three seconds in the direction of the X axis shown in FIG. 6B at a certain speed.

The position coordinates of the laser distance measuring device 21 are the position coordinates of the projection reference point 21a which are measured every second by the GNSS device 22. The position coordinates of the left camera 20a and the right camera 20b are calculated by assuming that the left camera 20a and the right camera 20b are apart, by the length of each of the arms 20c and 20d which is 1 m, from the position of the projection reference point 21a in directions of the Y axis.

In FIGS. 6B to 6D, a large square symbol denotes the position coordinates of the left camera 20a at a time t=0. A large inverse triangle symbol denotes the position coordinates of the right camera 20b at the time t=0, and a small square symbol denotes the position coordinates of the laser distance measuring device 21 at the time t=0.

Further, a large square symbol with a point denotes the position coordinates of the left camera 20a at a time t=1. A large inverse triangle symbol with a point denotes the position coordinates of the right camera 20b at the time t=1, and a small square symbol with a point denotes the position coordinates of the laser distance measuring device 21 at the time t=1.

A large circle symbol denotes the position coordinates of the left camera 20a at a time t=2. A large triangle symbol denotes the position coordinates of the right camera 20b at the time t=2, and a small circle symbol denotes the position coordinates of the laser distance measuring device 21 at the time t=2.

A large circle symbol with a point denotes the position coordinates of the left camera 20a at a time t=3. A large triangle symbol with a point denotes the position coordinates of the right camera 20b at the time t=3, and a small circle symbol with a point denotes the position coordinates of the laser distance measuring device 21 at the time t=3.

As explained using FIG. 5, in the unit which consists of the left camera 20a, the right camera 20b and the laser distance measuring device 21, these components are connected along a direction of the Y axis in order of the left camera 20a, the laser distance measuring device 21 and the right camera 20b. For this reason, as shown in FIG. 6B, the positions of the left camera 20a, the right camera 20b and the laser distance measuring device 21 matched one another with respect to the directions of the Y axis.

After the time t=1, the positions of the left camera 20a, the right camera 20b and the laser distance measuring device 21 shifted toward a direction of the Z axis.

Further, as shown in FIGS. 6C and 6D, the positions of the left camera 20a, the right camera 20b and the laser distance measuring device 21 shifted by 0.5 m toward a direction of the Y axis within a time interval from time t=1 to time=2, and then returned to the same position as the point of origin at time t=3.

Considering the graphs of FIGS. 6B to 6D, the position of the airplane 2 had shifted toward the direction of the Y axis and the direction of the Z axis for three seconds, and the airplane 2 had flown for three seconds while rotating.

FIG. 7 illustrates diagrams showing changes in measurement results acquired by the laser distance measuring device 21, the changes being caused by the flight of the airplane 2, and shows the measurement results acquired when the airplane 2 flew in the state shown in FIG. 6.

Figures 7A, 7B:
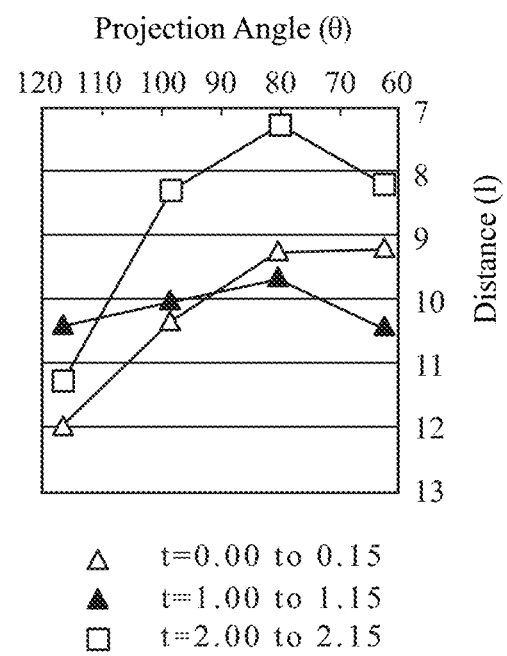
FIG. 7A shows angle data and distance data acquired at times.
FIG. 7B is a graph in which the data shown in FIG. 7A are plotted.

FIG. 7A shows the angle data and the distance data at each of times, and FIG. 7B is a graph in which the data shown in FIG. 7A are plotted.

Figure 8:
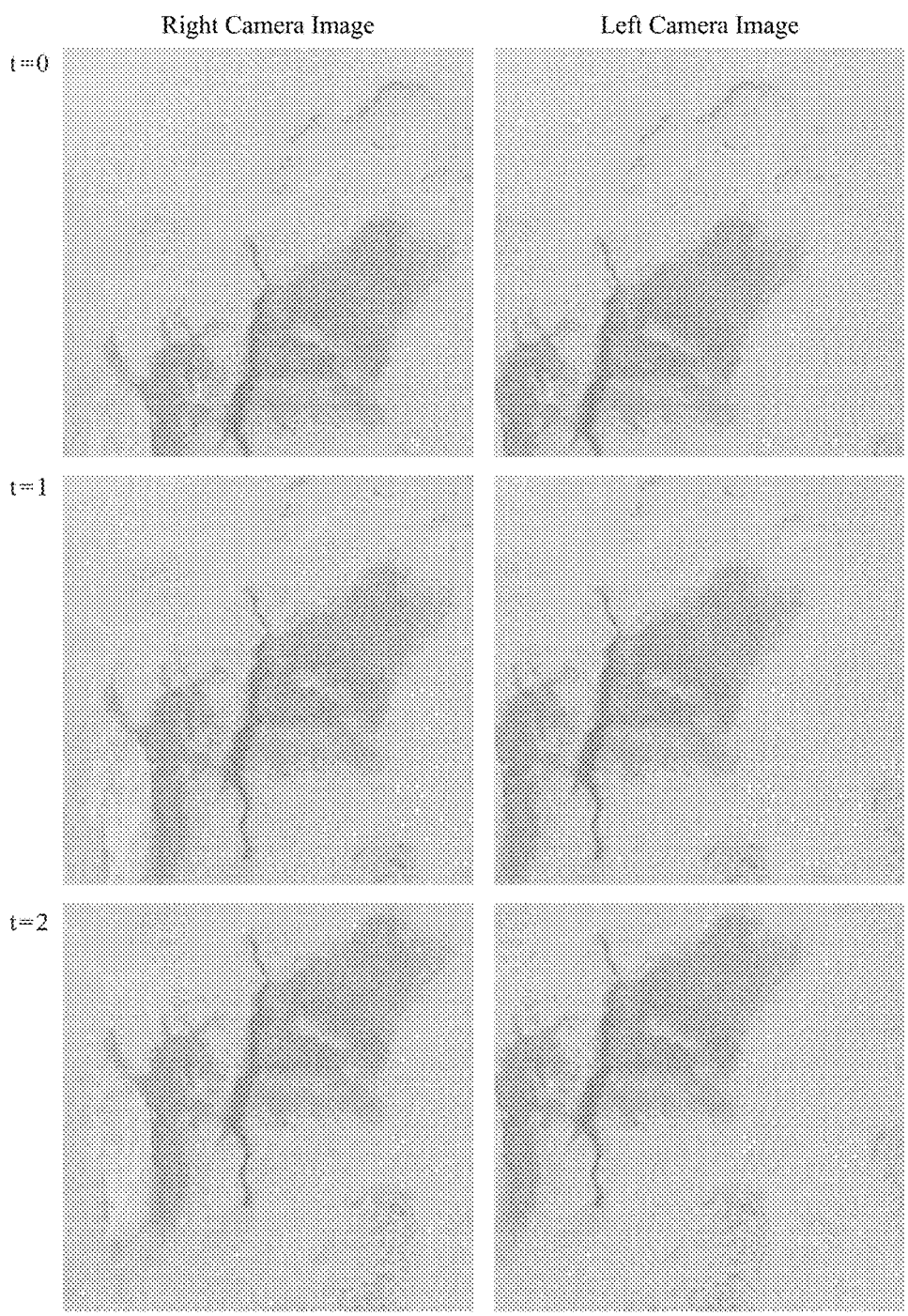
FIG. 8 is a diagram showing images which are shot every second by the left camera and the right camera.

Further, FIG. 8 is a diagram showing images which were shot every second by the left camera 20a and the right camera 20b, and shows the images which were shot when the airplane 2 flew in the state shown in FIG. 6.

As shown in FIG. 7A, the measurement results acquired by the laser distance measuring device 21 are stored in the memory card 23 in such a way that each set of a measurement time t, a projection angle $\theta$ and a distance l is defined as one record. Here, it is assumed that the laser distance measuring device 21 performs four measurements per second. In addition, the projection angle $\theta$ is taken in such a manner that the vertical direction downward from the projection reference point 21a, shown in FIG. 5B, is 90 degrees.

As shown in FIG. 5B, the laser distance measuring device 21 scans the laser light by rotating the projection reference point 21a clockwise in steps of 18 degrees around the X axis when viewed from the positive direction of the X axis.

In FIG. 7B, white triangle symbols denote angle data and distance data at times t=0.00 to 0.15, black triangle symbols denote angle data and distance data at times t=1.00 to 1.15, and white rectangle symbols denote angle data and distance data at times t=2.00 to 2.15.

As explained with reference to FIG. 6, when the airplane 2 flies while rotating, laser light is also projected from the laser distance measuring device 21 while the laser light is inclined. More specifically, distance data and angle data as shown in FIGS. 7A and 7B also change dependently on the attitude angles of the airplane 2.

Further, when the airplane 2 flies while rotating, the shooting directions of the left camera 20a and the right camera 20b are also inclined. As a result, left camera images and right camera images, as shown in FIG. 8, which are shot by the left camera image 20a and the right camera 20b, also change dependently on the attitude angles of the airplane 2.

Therefore, an error depending on the attitude angles of the airplane 2 occurs between the coordinates of a distance measurement point on an image, the coordinates being calculated using distance data, angle data, coordinate data and image data on the assumption that the airplane 2 makes a level flight, and the coordinates of the same distance measurement point when the airplane 2 actually flies while rotating.

Accordingly, in the present invention, the attitude angles are corrected in such a way that the above-mentioned error becomes small, and the attitude angles that minimize the above-mentioned error are determined as the estimated values of the attitude angles of the airplane 2. Hereafter, an overview of a process of estimating the attitude angles according to the present invention will be explained.

Figure 9:
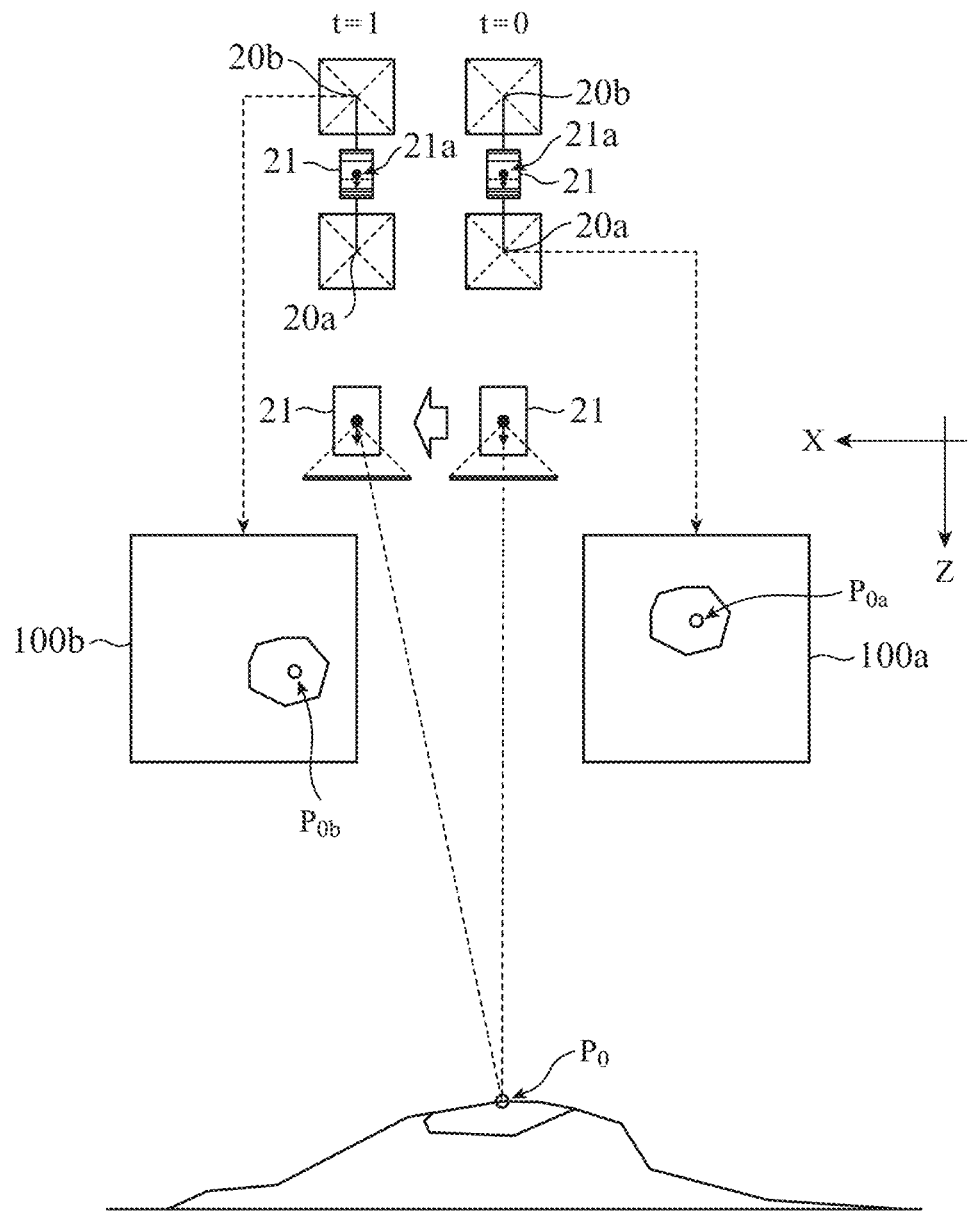
FIG. 9 is a diagram showing images which are shot by the left camera and the right camera while the airplane makes a level flight and each of which contains a distance measurement point of the laser distance measuring device.

FIG. 9 is a diagram showing images 100a and 100b which are shot by the left camera 20a and the right camera 20b while the airplane 2 makes a level flight and each of which contains a distance measurement point $P_0$ of the laser distance measuring device 21. In FIG. 9, it is assumed that the airplane 2 makes a level flight along with the positive direction of the X axis.

In this example, it is assumed that a ground surface below the airplane 2 is shot by the left camera 20a and the right camera 20b every second, and the laser distance measuring device 21 measures the distance to the distance measurement point $P_0$ located directly under the airframe of the airplane with the projection angle $\theta$ being set to be 90 degrees.

Further, the coordinates $P_{0a}$ of the distance measurement point $P_0$ on the image 100a which is shot at a time t=0 by the left camera 20a can be calculated from both the three-dimensional coordinates of the projection reference point 21a of the laser light and the attitude angles of the airplane 2 at the time t=0.

Similarly, the coordinates $P_{0b}$ of the distance measurement point $P_0$ on the image 100b which is shot at a time t=1 by the right camera 20b can be calculated from both the three-dimensional coordinates of the projection reference point 21a and the attitude angles of the airplane 2 at the time t=1.

In the example shown in FIG. 9, because it is assumed that the airplane 2 makes a level flight, the attitude angles are zeros.

Figure 10:
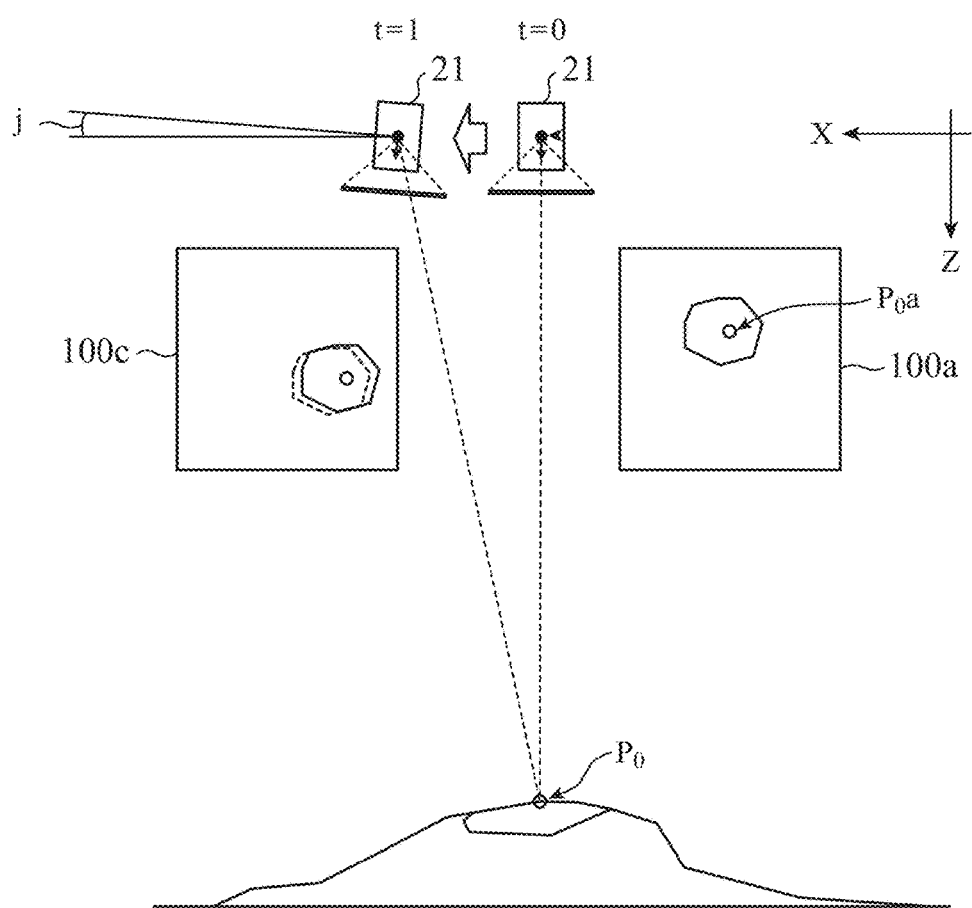
FIG. 10 is a diagram showing images which are shot by the left camera and the right camera when the airplane flies while the airplane is tilted in a pitch direction and each of which contains a distance measurement point of the laser distance measuring device.

FIG. 10 is a diagram showing images 100a and 100c which are shot by the left camera 20a and the right camera 20b when the airplane 2 flies while the airplane is tilted in a pitch direction and each of which contains a distance measurement point $P_0$ of the laser distance measuring device 21. In the example shown in FIG. 10, it is assumed that the airplane 2 flies while the airplane is tilted by a pitch angle $\phi$ at the time t=1. In this example, in the image 100c shot at the time t=1 by the right camera 20b, the object to be shot is seen at a position close to the right as a whole, as shown by a broken chain line, as compared with the example shown in FIG. 9.

Figure 11:
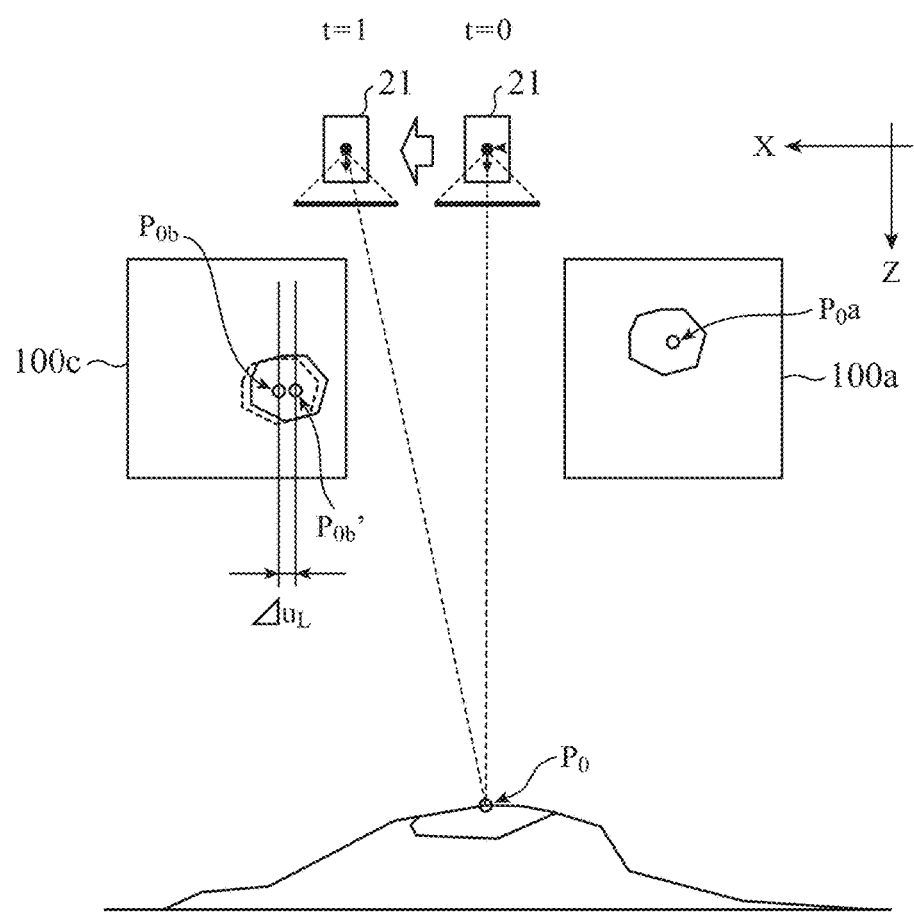
FIG. 11 is a diagram showing an error occurring between the coordinates of a distance measurement point on an image, the coordinates being calculated on the assumption that the airplane makes a level flight, and the coordinates of a corresponding point on an image shot when the airplane flies while the airplane is tilted in a pitch direction.

FIG. 11 is a diagram showing an error occurring between the coordinates of a distance measurement point $P_0$ on an image, the coordinates being calculated on the assumption that the airplane 2 makes a level flight, and the coordinates of a corresponding point on an image shot when the airplane 2 flies while the airplane is tilted in a pitch direction. The coordinates $P_{0b}$ of the distance measurement point $P_0$ on the image 100c shown in FIG. 11 are calculated on the assumption that the airplane 2 flies without rotating also at the time t=1, like in the example shown in FIG. 9. On the other hand, as a result of searching through the image 100c for a point corresponding to the coordinates $P_{0a}$ of the distance measurement point $P_0$ on the image 100a which is shot at the time t=0 by the left camera 20a by performing image matching, the coordinates $P_{0b}'$ of the point on the image 100c are acquired.

Such the difference $\Delta u_L$ between the coordinates $P_{0b}$ and the coordinates $P_{0b}'$ occurs as a result of calculating the coordinates $P_{0b}$ of the distance measurement point $P_0$ on the image 100c on the assumption that the airplane 2 flies without rotating, even though the airplane 2 actually flies while rotating. Therefore, the attitude angles of the airplane 2 which minimize the difference $\Delta u_L$ are defined as estimated results expressing the attitude of the actual airplane 2 appropriately.

For example, because in the example shown in FIG. 11 the difference $\Delta u_L$ is minimized when the airplane 2 is tilted by the pitch angle $\phi$, the pitch angle $\phi$ is acquired as an estimated result of the attitude.

Although the airplane 2 actually rotates also in both a rolling direction and a yawing direction, in addition to a pitching direction, what is necessary in this case is just to similarly estimate the roll angle ω and the yaw angle κ.

Next, operations will be explained.

Figure 12:
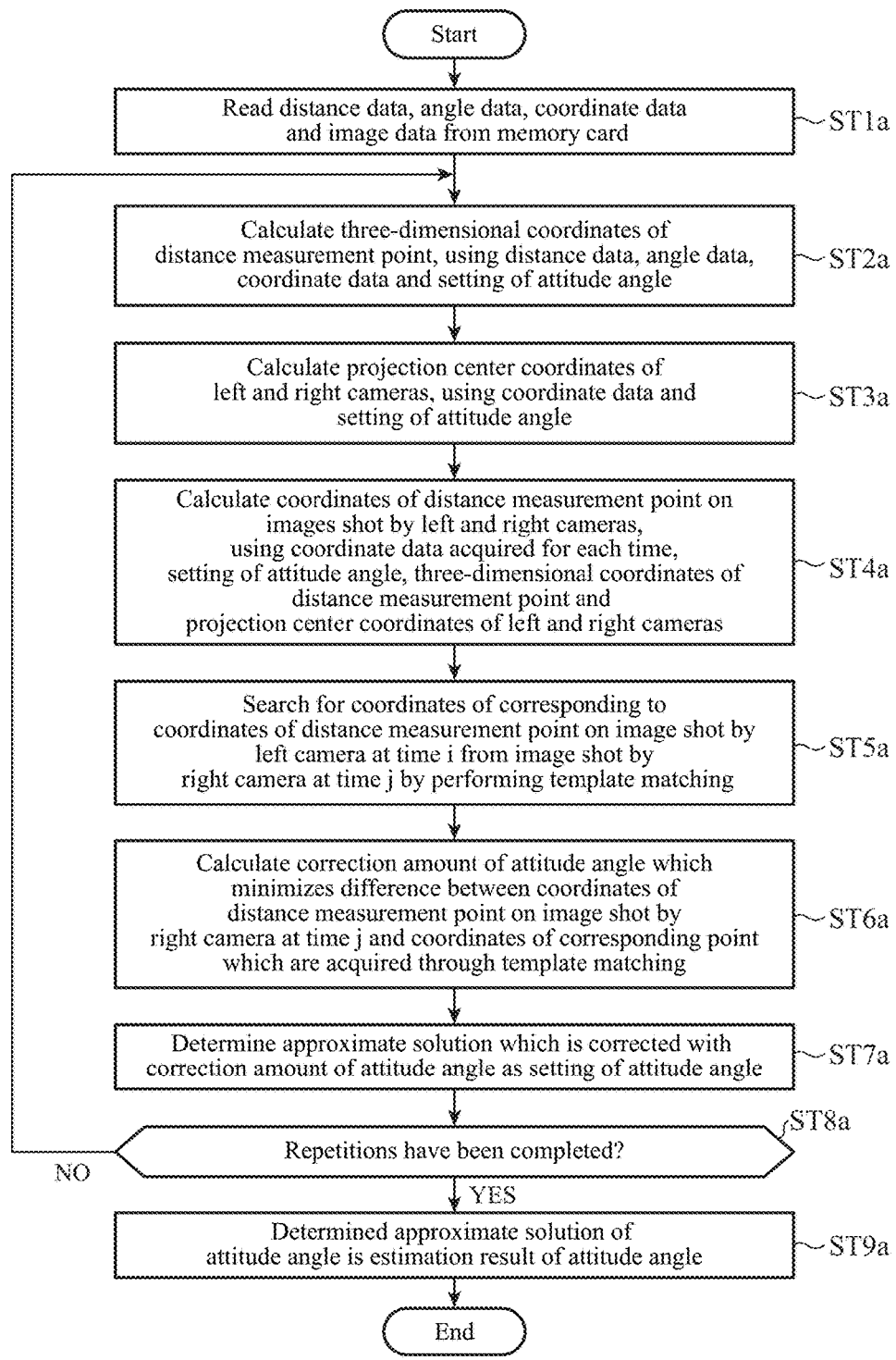
FIG. 12 is a flow chart showing the operation of the navigation system according to Embodiment 1.

FIG. 12 is a flow chart showing the operation of the navigation system 3 according to Embodiment 1, and shows a series of processes of estimating the attitude angles of the airplane 2 in flight.

Hereafter, the attitude angles of the airplane 2 are expressed by the three parameters including the roll angle ω, the pitch angle ϕ and the yaw angle κ, and these angles are estimated per second.

Because it is assumed hereafter that the attitude angles (ω, ϕ, κ) at a time t=0 and t=3 are (0, 0, 0) for the sake of convenience, the unknown attitude angles (ω, ϕ, κ) at a time t=1 and those at a time t=2 may be estimated. More specifically, the attitude angles, six in total, which are unknown are estimated.

First, the data acquiring unit 30 reads and acquires distance data, angle data, coordinate data and image data from the memory card 23 mounted in the airplane 2 (step ST1a).

Each distance data shows the distance l measured by the laser distance measuring device 21 from the projection reference point 21a of laser light to a distance measurement point $P_0$, and each angle data shows the projection angle θ of laser light. Each coordinate data shows the three-dimensional coordinates $(X_0, Y_0, Z_0)$ of the projection reference point 21a of laser light, the three-dimensional coordinates being measured by the GNSS device 22. Each image data shows images each containing a distance measurement point $P_0$ on an object to be shot, the images being shot by the left camera 20a and the right camera 20b.

By using data accumulated in the memory card 23 during a flight of the airplane 2 the attitude of the airplane 2 can be estimated after the flight has been ended, and by using estimated attitude angles survey results can also be corrected.

Next, the coordinate calculating unit 31 calculates the three-dimensional coordinates (X, Y, Z) of each distance measurement point $P_0$ in accordance with the following expression (1) by using the distance data, the angle data and the coordinate data, which are acquired by the data acquiring unit 30, and the settings of the attitude angles (ω, ϕ, κ) of the airplane 2 (step ST2a).

In the following expression (1), $a_{11}$ to $a_{33}$ denote the elements of a 3×3 rotation matrix showing the inclinations of the laser distance measuring device 21, the left camera 20a and the right camera 20b, the inclinations depending on the attitude of the airplane 2.

$$\begin{pmatrix} a_{11} & a_{12} & a_{13} \\ a_{21} & a_{22} & a_{23} \\ a_{31} & a_{32} & a_{33} \end{pmatrix} \begin{pmatrix} 0 \\ l\cos\theta \\ l\sin\theta \end{pmatrix} + \begin{pmatrix} X_0 \\ Y_0 \\ Z_0 \end{pmatrix} \quad (1)$$

In this expression, $$\begin{pmatrix} a_{11} & a_{12} & a_{13} \\ a_{21} & a_{22} & a_{23} \\ a_{31} & a_{32} & a_{33} \end{pmatrix} =$$

$$\begin{pmatrix} \cos\kappa & -\sin\kappa & 0 \\ \sin\kappa & \cos\kappa & 0 \\ 0 & 0 & 1 \end{pmatrix} \begin{pmatrix} \cos\varphi & 0 & \sin\varphi \\ 0 & 1 & 0 \\ -\sin\varphi & 0 & \cos\varphi \end{pmatrix} \begin{pmatrix} 1 & 0 & 0 \\ 0 & \cos\omega & -\sin\omega \\ 0 & \sin\omega & \cos\omega \end{pmatrix}.$$

Further, in the above-mentioned expression (1), $(X_0, Y_0, Z_0)$ denote the three-dimensional coordinates of the projection reference point 21a of laser light, the three-dimensional coordinates being shown by each of the above-mentioned coordinate data. θ denotes the projection angle of the laser light which is shown by the corresponding one of the above-mentioned angle data, and l denotes the distance from the projection reference point 21a of the laser light to the distance measurement point $P_0$, the distance being shown by the corresponding one of the above-mentioned distance data. The projection angle θ is defined by assuming that the vertically downward direction with respect to the airplane 2 makes an angle of 90 degrees.

Further, the settings of the attitude angles are (ω, ϕ, κ)=(0, 0, 0) by assuming that the airplane 2 had made a level flight.

Results of calculating the three-dimensional coordinates (X, Y, Z) of each distance measurement point $P_0$ by using the coordinate data at the times t=0 to 2 shown in FIG. 6A, and the angle data and the distance data for the distance measurement point $P_0$ at the times t=0 to 2 shown in FIG. 7A are shown in FIG. 13.

Next, the coordinate calculating unit 31 calculates the second-by-second projection center coordinates $(X_L, Y_L, Z_L)$ of the left camera 20a and the second-by-second projection center coordinates $(X_R, Y_R, Z_R)$ of the right camera 20b by using the coordinate data and the settings of the attitude angles, in accordance with the following expressions (2) and (3) (step ST3a).

Results of calculating the projection center coordinates by assuming that the settings of the attitude angles are (ω, ϕ, κ)=(0, 0, 0), and by using the coordinate data at the times t=0 to 2 shown in FIG. 6A are shown in FIG. 14.

$$\begin{pmatrix} X_L \\ Y_L \\ Z_L \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} 0 \\ -1.0 \\ 0 \end{pmatrix} + \begin{pmatrix} X_0 \\ Y_0 \\ Z_0 \end{pmatrix} \quad (2)$$

$$\begin{pmatrix} X_R \\ Y_R \\ Z_R \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} 0 \\ 1.0 \\ 0 \end{pmatrix} + \begin{pmatrix} X_0 \\ Y_0 \\ Z_0 \end{pmatrix} \quad (3)$$

Next, the coordinate calculating unit 31 calculates the coordinates $(x_L, y_L)$ of a distance measurement point $P_0$ on a left camera image and the coordinates $(x_R, y_R)$ of the distance measurement point $P_0$ on a right camera image on the basis of the coordinate data, the settings of the attitude angles, the three-dimensional coordinates of the distance measurement point $P_0$, the projection center coordinates of the left camera 20a, and the projection center coordinates of the right camera 20b, in accordance with the following expressions (4) and (5) (step ST4a).

In the following expressions (4) and (5), c denotes the focal distance of each of the left and right cameras 20a and 20b.

$$x_L = -c\frac{U_L}{W_L} \quad y_L = -c\frac{V_L}{W_L} \quad (4)$$

-continued $$x_R = -c\frac{U_R}{W_R} \quad y_R = -c\frac{V_R}{W_R} \qquad (5)$$

where $$U_L = b_{11}(X - X_L) + b_{12}(Y - Y_L) + b_{13}(Z - Z_L)$$
$$V_L = b_{21}(X - X_L) + b_{22}(Y - Y_L) + b_{23}(Z - Z_L)$$
$$W_L = b_{31}(X - X_L) + b_{32}(Y - Y_L) + b_{33}(Z - Z_L)$$
$$U_R = b_{11}(X - X_R) + b_{12}(Y - Y_R) + b_{13}(Z - Z_R)$$
$$V_R = b_{21}(X - X_R) + b_{22}(Y - Y_R) + b_{23}(Z - Z_R)$$
$$W_R = b_{31}(X - X_R) + b_{32}(Y - Y_R) + b_{33}(Z - Z_R)$$

$$\begin{pmatrix} b_{11} & b_{12} & b_{13} \\ b_{21} & b_{22} & b_{23} \\ b_{31} & b_{32} & b_{33} \end{pmatrix} = \begin{pmatrix} 1 & 0 & 0 \\ 0 & \cos(-\omega) & -\sin(-\omega) \\ 0 & \sin(-\omega) & \cos(-\omega) \end{pmatrix}$$

$$\begin{pmatrix} \cos(-\varphi) & 0 & \sin(-\varphi) \\ 0 & 1 & 0 \\ -\sin(-\varphi) & 0 & \cos(-\varphi) \end{pmatrix} \begin{pmatrix} \cos(-\kappa) & -\sin(-\kappa) & 0 \\ \sin(-\kappa) & \cos(-\kappa) & 0 \\ 0 & 0 & 1 \end{pmatrix}.$$

FIG. 15 shows results of calculation of the coordinates $(x_L, y_L)$ of a distance measurement point $P_0$ on each left camera image and the coordinates $(x_R, y_R)$ of the distance measurement point $P_0$ on the corresponding right camera image. The calculation is made using the coordinate data at the times t=0 to 2 shown in FIG. 6A, the three-dimensional coordinates $(X, Y, Z)$ of each distance measurement point $P_0$ shown in FIG. 13, and the projection center coordinates shown in FIG. 14.

Next, the image matching unit 32 extracts, as a pair, a left camera image shot at a time i and a right camera image shot at a time j later than the time i by +1 from the image data acquired by the data acquiring unit 30. The process of extracting a pair of image data which is a target for image matching in this way is referred to as pairing. Through this pairing, a pair of image data about images which are shot at different shooting positions is acquired.

Then, the image matching unit 32 searches for a point corresponding to the coordinates $(x_L, y_L)$ of a distance measurement point $P_0$ on the left camera image shot at the time i, the coordinates being calculated by the coordinate calculating unit 31, from the right camera image shot at the time j by performing template matching on the left camera image shot at the time i and the right camera image shot at the time j (step ST5a).

FIG. 16 shows a correspondence between the coordinates of the distance measurement point $P_0$ on the left camera image at the time i, and the coordinates of the point corresponding to the coordinates of the distance measurement point and existing on the right camera image shot at the time j, the point being searched for through the template matching.

$SCAN_x(x_{Li}, y_{Li})$ denotes the x coordinate of the corresponding point which is searched for by performing template matching on the right camera image shot at the time j with respect to a small region centered at the coordinates $(x_{Li}, y_{Li})$ of the distance measurement point $P_0$ on the left camera image shot at the time i. Further, $SCAN_y(x_{Li}, y_{Li})$ denotes the y coordinate of the corresponding point which is searched for by performing template matching in the same way.

As shown in FIG. 16, there occurs a difference between the coordinates $(x_{Rj}, y_{Rj})$ of the distance measurement point $P_0$ on the right camera image shot at the time j, the coordinates being calculated by the coordinate calculating unit 31, and the coordinates ($SCAN_x(x_{Li}, y_{Li})$, $SCAN_y(x_{Li}, y_{Li})$) of the corresponding point which is searched for by the image matching unit 32. This is because the attitude angles ($\omega$, $\phi$, $\kappa$) of the airplane 2 have values other than zeros.

More specifically, by setting appropriate attitude angles ($\omega$, $\phi$, $\kappa$) showing the attitude of the airplane 2 in flight, and then re-calculating the coordinates as shown in FIG. 16, the above-mentioned coordinates ($x_{Rj}$, $y_{Rj}$) are made to match the above-mentioned coordinates ($SCAN_x(x_{Li}, y_{Li})$, $SCAN_y(x_{Li}, y_{Li})$).

Therefore, the attitude angles which minimize the difference between the above-mentioned pair of coordinates are set as the estimated values of the attitude angles of the airplane 2.

Returning to the explanation of FIG. 12, a case in which the attitude estimating unit 33 estimates the attitude angles of the airplane 2 in accordance with a procedure based on a nonlinear least square method will be explained.

The attitude estimating unit 33 calculates the correction amounts for the attitude angles which reduce the difference between the coordinates ($x_{Rj}$, $y_{Rj}$) of the distance measurement point $P_0$ on the right camera image shot at the time j and the coordinates ($SCAN_x(x_{Li}, y_{Li})$, $SCAN_y(x_{Li}, y_{Li})$) of the corresponding point which is searched for by the image matching unit 32 (step ST6a). For example, observation equations $v_x$ and $v_y$ which are shown in the following expression (6) are used.

$$v_x = \frac{\partial F_x}{\partial \omega}\delta\omega + \frac{\partial F_x}{\partial \varphi}\delta\varphi + \frac{\partial F_x}{\partial \kappa}\delta\kappa - \tilde{F}_x \qquad (6)$$

$$v_y = \frac{\partial F_y}{\partial \omega}\delta\omega + \frac{\partial F_y}{\partial \varphi}\delta\varphi + \frac{\partial F_y}{\partial \kappa}\delta\kappa - \tilde{F}_y$$

$$\omega = \tilde{\omega} + \delta\omega \quad \varphi = \tilde{\varphi} + \delta\varphi \quad \kappa = \tilde{\kappa} + \delta\kappa$$

$$F_x = SCAN_x(x_L, y_L) - x_R \quad F_y = SCAN_y(x_L, y_L) - y_R$$

In the above-mentioned expression (6), tilde $\omega$ ($\omega$), tilde $\phi$ ($\phi$) and tilde $\kappa$ ($\kappa$) are approximate solutions of the roll angle $\omega$, the pitch angle $\phi$ and the yaw angle $\kappa$ which are unknown. $\delta\omega$, $\delta\phi$, and $\delta\kappa$ are the correction amounts for the approximate solutions tilde $\omega$, tilde $\phi$ and tilde $\kappa$.

Further, $\partial F_x/\partial\omega$ is the partial derivative of $F_x$ with respect to the roll angle $\omega$, $\partial F_x/\partial\phi$ is the partial derivative of $F_x$ with respect to the pitch angle $\phi$, and $\partial F_x/\partial\kappa$ is the partial derivative of $F_x$ with respect to the yaw angle $\kappa$. These partial derivatives are coefficients whose values are acquired by substitutions of the approximate solutions tilde $\omega$, tilde $\phi$ and tilde $\kappa$.

Similarly, $\partial F_y/\partial\omega$ is the partial derivative of $F_y$ with respect to the roll angle $\omega$, $\partial F_y/\partial\phi$ is the partial derivative of $F_y$ with respect to the pitch angle $\phi$, and $\partial F_y/\partial\kappa$ is the partial derivative of $F_y$ with respect to the yaw angle $\kappa$. These partial derivatives are also coefficients whose values are acquired by substitutions of the approximate solutions tilde $\omega$, tilde $\phi$ and tilde $\kappa$.

Tilde $F_x$ ($F_x$) is a value which is acquired by substituting $SCANx(x_L, y_L)$ and an approximate solution of $x_R$ into $F_x$, tilde $F_y$ ($F_y$) is a value which is acquired by substituting $SCANy(x_L, y_L)$ and an approximate solution of $y_R$ into $F_y$.

When the data shown in FIG. 16 are used, as to each of pairs of a left camera image shot at a time t=i and a right camera image shot at a time t=i+1, four observation equations $v_x$ are acquired for x and four observation equations $v_y$ are acquired for y. Therefore, the number of observation equations is obtained as 3×4×2=24. A constant vector for the observation equations at this time is shown in FIG. 17.

Next, the attitude estimating unit 33 partially differentiates the observation equations with respect to each of the six unknown quantities. For example, the attitude estimating unit partially differentiates the observation equations with respect to the roll angle $\omega$, the pitch angle $\phi$ and the yaw angle $\kappa$ at the time t=1 and, after that, partially differentiates the observation equations with respect to the roll angle $\omega$, the pitch angle $\phi$ and the yaw angle $\kappa$ at the time t=2.

A 24×6 design matrix which consists of partial differential coefficients which are calculated for the observation equations in this way is shown in FIG. 18.

The attitude estimating unit 33 then calculates the product of the transpose of this design matrix and the design matrix. A calculation result acquired using the design matrix shown in FIG. 18 is shown in FIG. 19.

The attitude estimating unit 33 further calculates the product of the transpose of this design matrix, and the constant vector shown in FIG. 17. A result of this calculation is shown in FIG. 20.

After that, the attitude estimating unit 33 calculates the product of the inverse matrix calculated from the matrix shown in FIG. 19, and the vector shown in FIG. 20. A result of this calculation is the correction amounts ($\delta\omega$, $\delta\phi$, $\delta\kappa$) for the attitude angles shown in FIG. 21.

Because it is assumed initially that the airplane 2 makes a level flight without rotating, and (0, 0, 0) are set as the initial values of the attitude angles ($\omega$, $\phi$, $\kappa$), the above-mentioned correction amounts serve as the approximate solutions of the attitude angles, just as they are.

The attitude estimating unit 33 adds the correction amounts which the attitude estimating unit calculates in the above-mentioned way to the previous approximate solutions to correct these approximate solutions, and determines the corrected approximate solutions as the settings of the attitude angles (step ST7$a$). At this time, when the series of processes has not been performed the predetermined number of repetitions (when NO in step ST8$a$), the attitude estimating unit 33 instructs the coordinate calculating unit 31 to perform the same coordinate calculation as the above-mentioned coordinate calculation.

As a result, the coordinate calculating unit 31 performs the processes in steps ST2$a$ to ST4$a$ by using the corrected approximate solutions as the settings of the attitude angles, and the image matching unit 32 performs the process in step ST5$a$.

By using the correction amounts ($\delta\omega$, $\delta\phi$, $\delta\kappa$) which are calculated by repeatedly performing the above-mentioned series of processes, the difference between the coordinates ($x_{Rj}$, $y_{Rj}$) of the distance measurement point $P_0$ on the right camera image shot at the time j and the coordinates (SCAN$_x$ ($x_{Li}$, $y_{Li}$), SCAN$_y$ ($x_{Li}$, $y_{Li}$)) of the corresponding point which is searched for by the image matching unit 32 becomes small.

When the above-mentioned series of processes has been performed the predetermined number of repetitions (when YES in step ST8$a$), and the correction amounts which minimize the difference between the above-mentioned coordinates are acquired, the attitude estimating unit 33 outputs the approximate solutions which are corrected by using these correction amounts as final estimated results of the attitude angles (step ST9$a$).

Figures 21, 22, 23:
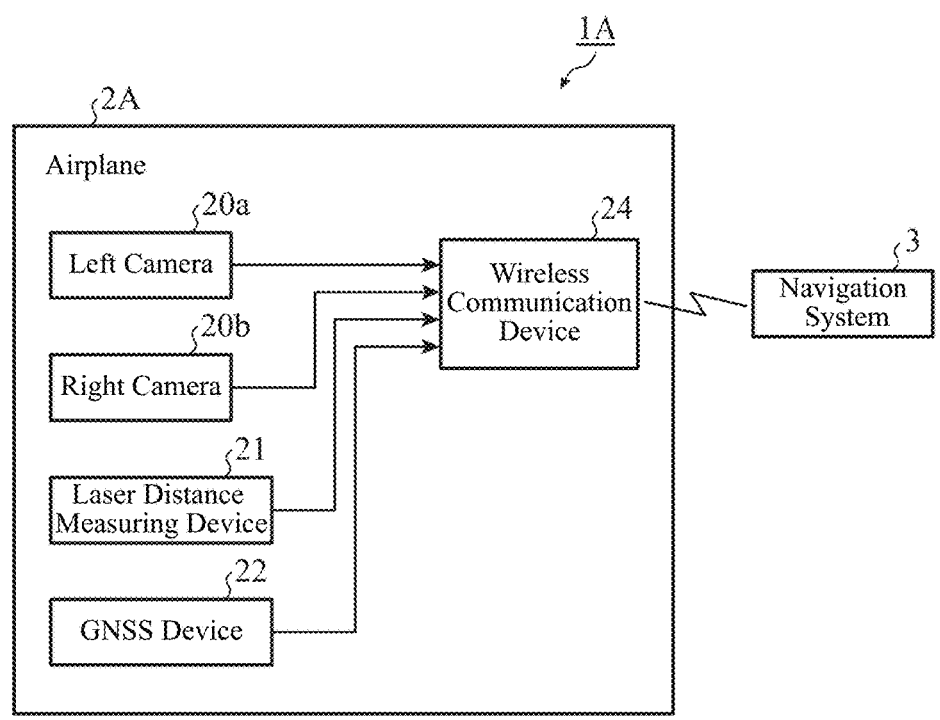
FIG. 21 is a diagram showing correction amounts for attitude angles.
FIG. 22 is a diagram showing estimated results of final attitude angles.
FIG. 23 is a block diagram showing the configuration of a survey system according to Embodiment 2 of the present invention.

The estimated results of the attitude angles at the times t=0.00 to 3.00, which are acquired in this way, are shown in FIG. 22.

Although the case in which a pair of a left camera image shot at a time i and a right camera image shot at a time j (=i+1) is used as the pair of image data is shown above, a pair of a left camera image shot at a time i and a right camera image shot at the time i can be alternatively used. More specifically, according to the present invention, it is sufficient that a pair of image data about images shot at different shooting positions is used.

As stereo image processing for searching for corresponding points between images shot by cameras located at different positions, and acquiring three-dimensional information including the distance to an observation object and depth information, there are a method called fixed stereo and a method called motion stereo.

In the fixed stereo, two cameras are arranged at a spacing, and images are shot by the cameras. Pairing of a left camera image shot at a time i and a right camera image shot at the time i is equivalent to the fixed stereo.

In the motion stereo, images are shot from different shooting positions by a camera while the camera is moved. Pairing of a left camera image shot at a time i and a right camera image shot at a time j (=i+1) is equivalent to the motion stereo.

Further, although the configuration using the left camera 20$a$ and the right camera 20$b$ is shown in the above explanation, only one camera can be used instead of the two cameras. In this case, a pair of a camera image shot at a time i and a camera image shot at a time j (=i+1) is used.

In addition, although the case in which the unknown quantities are the three parameters ($\omega$, $\phi$, $\kappa$) which are the attitude angles at each time is shown above, the six parameters additionally including the position coordinates (X, Y, Z) of the airplane 2 can be alternatively used, or an internal parameter, such as the focal distance c of the cameras, can be included.

As mentioned above, the navigation system 3 according to Embodiment 1 pays attention to the fact that the coordinates of corresponding points between images shot at different shooting positions deviate from each other dependently on the attitude of the airplane 2, and corrects the values of the parameters ($\omega$, $\phi$, $\kappa$) showing the attitude of the airplane 2 in such away that the difference between these coordinates becomes small, to estimate the attitude of the airplane 2. As a result, the attitude of the airplane 2 can be estimated even if an IMU and a stabilizer are not used.

Further, because the attitude of the airplane 2 is estimated by using, in addition to image data about an image containing a shot distance measurement point $P_0$, the distance l from the projection reference point 21$a$ of laser light to the distance measurement point $P_0$, the projection angle $\theta$ of the laser light and the three-dimensional coordinates (X, Y, Z) of the projection reference point 21$a$ of the laser light, the attitude of the airplane 2 can be estimated with a high degree of accuracy.

Further, in the navigation system 3 according to Embodiment 1, the pair of image data includes image data about an image shot at a time i during a flight of the airplane 2, and image data about an image shot at a time j later than this time i during the flight. By using such a pair of image data, a change in an object to be shot on an image, the change depending on the attitude of the airplane 2, can be used for the estimation of the attitude of the airplane 2.

Further, in the navigation system 3 according to Embodiment 1, the pair of image data includes a pair of image data about images shot at a time i by the left camera 20$a$ and the right camera 20$b$, or a pair of image data about an image shot at a time i by at least one of the left camera 20$a$ and the right cameras 20$b$ and image data about an image shot at a time j later than the time i by at least one of the left and right cameras.

Even by using such image data, a change in an object to be shot on an image, the change depending on the attitude of the airplane 2, can be used for the estimation of the attitude of the airplane 2.

In addition, although the navigation system 3 according to Embodiment 1 performs the calculation of the coordinates by setting the initial value of the yaw angle κ to zero, the navigation system can acquire an approximate solution of the yaw angle κ from a time series of three-dimensional coordinates which is measured by the GNSS device 22. Therefore, a value calculated from the time series of three-dimensional coordinates measured by the GNSS device 22 can be used as the initial value of the yaw angle κ.

In addition, the survey system 1 according to Embodiment 1 is provided with the memory card 23 mounted in the airplane 2. The data acquiring unit 30 reads and acquires distance data, angle data, coordinate data and image data which are stored in the memory card 23.

By using data which are stored in the memory card 23 during a flight of the airplane 2 in this way the attitude of the airplane 2 can be estimated after the flight has been ended, and the survey results can also be corrected by using the estimated attitude angles.

Embodiment 2.

FIG. 23 is a block diagram showing the configuration of a survey system 1A according to Embodiment 2 of the present invention. The survey system 1A surveys geographical features from an airplane 2A, and includes a left camera 20a, a right camera 20b, a laser distance measuring device 21, a GNSS device 22 and a wireless communication device 24 which are mounted in the airplane 2A, and a navigation system 3.

The wireless communication device 24 transmits distance data, angle data, coordinate data and image data which are acquired during a flight of the airplane 2A to the navigation system 3.

The navigation system 3 is provided separately from the airplane 2A, as shown in FIG. 23. As an alternative, the navigation system 3 can be mounted in the airplane 2A.

A data acquiring unit 30 of the navigation system 3 receives and acquires the distance data, the angle data, the coordinate data and the image data which are transmitted by the wireless communication device 24.

The navigation system 3 estimates the attitude of the airplane 2A by performing the same processing as that shown in Embodiment 1 by using the above-mentioned data which the navigation system acquires in this way.

As mentioned above, the survey system 1A according to Embodiment 2 includes the wireless communication device 24 mounted in the airplane 2. The data acquiring unit 30 receives and acquires distance data, angle data, coordinate data and image data which are transmitted by the wireless communication device 24.

By using the data transmitted by radio from the wireless communication device 24 in this way, the attitude of the airplane 2A can be estimated during a flight of the airplane 2A. The survey results can also be corrected during a flight of the airplane 2A by using the estimated attitude angles.

Although the example in which the moving body described in the present invention is a flying body such as an airplane 2 is shown in the above explanation, the invention is not limited to this example. For example, the navigation system according to the present invention can be implemented as a mobile mapping system, and a vehicle in which this system is mounted is defined as a moving body. Further, a railroad car, a ship or a robot can be defined as a moving body, and the navigation system according to the present invention can be used as a device that estimates the attitude of the moving body. Also for such a moving body, the attitude angles (ω, φ, κ) of the moving body can be used similarly as the parameters showing the attitude of the moving body, and position information can be included in the parameters in some cases.

Note that any combinations of the above-described embodiments, any modifications to the components of each Embodiment, or omission of any components in each Embodiment can be made freely within the scope of the invention.

INDUSTRIAL APPLICABILITY

Because the navigation system according to the present invention can estimate the attitude of a moving body with a high degree of accuracy by using a configuration of not including any IMU and any stabilizer, the navigation system is suitable for use as, for example, a navigation system for UAV.

REFERENCE SIGNS LIST

1, 1A survey system; 2, 2A airplane; 3 navigation system; 20a left camera; 20b right camera; 20c, 20d arm; 21 laser distance measuring device; 21a projection reference point; 22 GNSS device; 23 memory card; 24 wireless communication device; 30 data acquiring unit; 31 coordinate calculating unit; 32 image matching unit; 33 attitude estimating unit; 100 processing circuit; 100a to 100c image; 101 CPU; and 102 memory.

The invention claimed is:

1. A navigation system comprising:
   a data acquiring unit for acquiring distance data showing a distance from a projection reference point of laser light to a distance measurement point, the distance being measured by a laser distance measuring device mounted in a moving body, angle data showing a projection angle of the laser light, coordinate data showing three-dimensional coordinates of the projection reference point of the laser light, the three-dimensional coordinates being measured by a coordinate measuring device mounted in the moving body, and image data containing a distance measurement point on an object taken by an image shooting device mounted in the moving body;
   a coordinate calculating unit for calculating coordinates of the distance measurement point on an image shown by the image data on a basis of the distance data, the angle data and the coordinate data that are acquired by the data acquiring unit, and a parameter showing an attitude of the moving body;
   an image matching unit for performing image matching on a pair of pieces of image data taken by the image shooting device at different shooting positions, and searching an image shown by one image data of the pair for a point corresponding to coordinates of a distance measurement point on an image shown by the other image data of the pair, the coordinates being calculated by the coordinate calculating unit; and
   an attitude estimating unit for correcting a value of the parameter showing the attitude of the moving body in such a way that a difference between coordinates of the distance measurement point on the image shown by the other image data of the pair, the coordinates being calculated by the coordinate calculating unit, and coordinates of the corresponding point searched for by the image matching unit becomes smaller, and estimating the attitude of the moving body.

2. The navigation system according to claim 1, wherein the pair comprises image data taken by the image shooting device at a time i during a movement of the moving body, and image data taken at a time j later than the time i during the movement of the moving body.

3. The navigation system according to claim 1, wherein the image shooting device includes a first shooting unit and a second shooting unit that are mounted in the moving body, and the pair comprises either image data taken by the first shooting unit at a time i and image data taken by the second shooting unit at the time i, or pieces of image data taken by at least one of the first and second shooting units at a time i and at a time j that is later than the time i.

4. A survey system comprising:
a laser distance measuring device to be mounted in a moving body to measure both distance data showing a distance from a projection reference point of laser light to a distance measurement point and angle data showing a projection angle of the laser light;
a coordinate measuring device to be mounted in the moving body to measure coordinate data showing three-dimensional coordinates of the projection reference point of the laser light;
an image shooting device to be mounted in the moving body to acquire image data containing a distance measurement point on an object to be taken; and
a navigation system including:
a data acquiring unit for acquiring the distance data, the angle data, the coordinate data and the image data;
a coordinate calculating unit for calculating coordinates of the distance measurement point on an image shown by the image data on a basis of distance data, angle data and coordinate data that are acquired by the data acquiring unit, and a parameter showing an attitude of the moving body;
an image matching unit for performing image matching on a pair of pieces of image data taken by the image shooting device at different shooting positions, and searching an image shown by one image data of the pair for a point corresponding to coordinates of a distance measurement point on an image shown by the other image data of the pair, the coordinates being calculated by the coordinate calculating unit; and
an attitude estimating unit for correcting a value of the parameter showing the attitude of the moving body in such a way that a difference between coordinates of the distance measurement point on the image shown by the other image data of the pair, the coordinates being calculated by the coordinate calculating unit, and coordinates of the corresponding point searched for by the image matching unit becomes smaller and estimating the attitude of the moving body.

5. The survey system according to claim 4, wherein the survey system includes a storage device to be mounted in the moving body to store the distance data, the angle data, the coordinate data and the image data, and the data acquiring unit reads and acquires the distance data, the angle data, the coordinate data and the image data stored in the storage device.

6. The survey system according to claim 4, wherein the survey system includes a wireless communication device to be mounted in the moving body to transmit the distance data, the angle data, the coordinate data and the image data, and the data acquiring unit receives and acquires the distance data, the angle data, the coordinate data and the image data which are transmitted by the wireless communication device.

* * * * *